US011238521B2

United States Patent
Malkiel et al.

(10) Patent No.: US 11,238,521 B2
(45) Date of Patent: Feb. 1, 2022

(54) TEXT-BASED SIMILARITY SYSTEM FOR COLD START RECOMMENDATIONS

(71) Applicant: Microsoft Technology Licensing, LLC, Redmond, WA (US)

(72) Inventors: Itzik Malkiel, Givaatayim (IL); Pavel Roit, Tel-Aviv (IL); Noam Koenigstein, Tel-Aviv (IL); Oren Barkan, Tel-Aviv (IL); Nir Nice, Salit (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 74 days.

(21) Appl. No.: 16/789,381

(22) Filed: Feb. 12, 2020

(65) Prior Publication Data

US 2021/0182935 A1 Jun. 17, 2021

Related U.S. Application Data

(60) Provisional application No. 62/946,919, filed on Dec. 11, 2019.

(51) Int. Cl.
*G06Q 30/06* (2012.01)
*G06N 20/00* (2019.01)
*G06F 16/9536* (2019.01)

(52) U.S. Cl.
CPC ..... *G06Q 30/0631* (2013.01); *G06F 16/9536* (2019.01); *G06N 20/00* (2019.01)

(58) Field of Classification Search
CPC ................................................ G06G 30/06–08
See application file for complete search history.

(56) References Cited

U.S. PATENT DOCUMENTS

| 2008/0320549 | A1* | 12/2008 | Bertino ................. G06F 21/604 726/1 |
| 2017/0186032 | A1* | 6/2017 | Rangasamy Kannadasan ............ G06Q 30/0625 |
| 2017/0235824 | A1 | 8/2017 | Liu |

OTHER PUBLICATIONS

Easy Masked Language Modeling with Machine Learning and HuggingFace Transformers, Chris Versloot, 2021 (Year: 2021).*
Adebayo, et al., "Sanity checks for saliency maps", In Proceedings of 32nd Conference on Neural Information Processing Systems, Dec. 3, 2018, pp. 1-11.

(Continued)

*Primary Examiner* — Ming Shui

(57) ABSTRACT

The disclosure herein describes a recommendation system utilizing a specialized domain-specific language model for generating cold-start recommendations in an absence of user-specific data based on a user-selection of a seed item. A generalized language model is trained using a domain-specific corpus of training data, including title and description pairs associated with candidate items in a domain-specific catalog. The language model is trained to distinguish between real title-description pairs and fake title-description pairs. The trained language model analyzes the title and description of the seed item with the title and description of each candidate item in the catalog to create a hybrid set of scores. The set of scores includes similarity scores and classification scores for the seed item title with each candidate item description and title. The scores are utilized by the model to identify candidate items maximizing similarity with the seed item for cold-start recommendation to a user.

20 Claims, 15 Drawing Sheets

(56) References Cited

OTHER PUBLICATIONS

Arya, et al., "One Explanation Does Not Fit All: A Toolkit and Taxonomy of AI Explainability Techniques", In Repository of arXiv:1909.03012v2, Sep. 14, 2019, pp. 1-18.
Barocas, et al., "The hidden assumptions behind counterfactual explanations and principal reasons", In Proceedings of the Conference on Fairness, Accountability, and Transparency, Jan. 27, 2020, pp. 80-89.
Comaniciu, et al., "Mean Shift: A Robust Approach Toward Feature Space Analysis", In Journal of IEEE Transactions on Pattern Analysis and Machine Intelligence, vol. 24, Issue 5, May 2002, pp. 603-619.
Devlin, et al., "Bert: Pre-Training of Deep Bidirectional Transformers for Language Understanding", In Repository of arXiv:1810.04805, May 24, 2019, 16 Pages.
Doshi-Velez, et al., "Towards a rigorous science of interpretable machine learning", In Repository of arXiv:1702.08608v2, Mar. 2, 2017, pp. 1-13.
Ebrahimi, et al., "Hotflip: White-box adversarial examples for text classification", In Repository of arXiv:1712.06751v2, May 24, 2018, 6 pages.
Gilpin, et al., "Explaining explanations: An overview of interpretability of machine learning", In Proceedings of IEEE 5th International Conference on data science and advanced analytics (DSAA), Oct. 1, 2018, pp. 80-89.
Goodman, et al., "Eu regulations on algorithmic decision-making and a "right to explanation", In ICML workshop on human interpretability in machine learning, Jun. 2016, pp. 26-30.
Gururangan, et al., "Don't stop pretraining: Adapt language models to domains and tasks", In Repository of arXiv:2004.10964v3, May 5, 2020, 19 Pages.
Hoover, et al., "exbert: A visual analysis tool to explore learned representations in transformers models", In Repository of arXiv:1910.05276v1, Oct. 11, 2019, pp. 1-8.
Kulesza, et al., "Explanatory debugging: Supporting enduser debugging of machine-learned programs", In Proceedings of IEEE Symposium on Visual Languages and Human-Centric Computing,, Sep. 21, 2010, pp. 41-48.
Lei, et al., "Rationalizing neural predictions", In Proceedings of the Conference on Empirical Methods in Natural Language Processing, Nov. 2016, pp. 107-117.
Liu, et al., "Roberta: A Robustly Optimized BERT Pretraining Approach", In Repository of arXiv:1907.11692, Jul. 26, 2019, 13 Pages.
Malkiel, et al., "Recobert: A catalog language model for text-based recommendations", In Repository of arXiv:2009.13292v1, Sep. 25, 2020, 12 pages.
Mikolov, et al., "Distributed Representations of Words and Phrases and their Compositionality", In Proceedings of 27th Annual Conference on Neural Information Processing Systems, Dec. 5, 2013, pp. 1-9.
Ribeiro, et al., "Why Should I Trust You?": Explaining the Predictions of Any Classifier, In Proceedings of the 22nd ACM SIGKDD International Conference on Knowledge Discovery and Data Mining, Aug. 2016, p. 1135-1144.
Selbst, et al., "Meaningful Information and the Right to Explanation", In Proceedings of the 1st Conference on Fairness, Accountability and Transparency, vol. 81, 2018, 1 Page.
Selbst, et al., "The intuitive appeal of explainable machines", In Fordham Law Review, vol. 87, Issue 3, 2018, pp. 1085-1139.
Selvaraju, et al., "Grad-cam: Visual explanations from deep networks via gradient-based localization", In International Journal of Computer Vision, vol. 128, Oct. 11, 2019, 9 Pages.
Springenberg, et al., "Striving for simplicity: The all convolutional net", In Proceedings of 3rd International Conference on Learning Representations, May 7, 2015, pp. 1-14.
Vaswani, et al., "Attention Is All You Need", In Publication of arXiv: 1706.03762v5 [cs.CL], Dec. 6, 2017, 15 Pages.
Wallace, et al., "AllenNLP Interpret: A Framework for Explaining Predictions of NLP Models", In Journal of Computing Research Repository, Sep. 19, 2019, 6 Pages.
Wu, et al., "Google's neural machine translation system: Bridging the gap between human and machine translation.", In Repository of arXiv:1609.08144v2, Oct. 8, 2016, pp. 1-23.
Xu, et al., "Bert post-training for review reading comprehension and aspect-based sentiment analysis", In Repository of arXiv:1904.02232v2, May 4, 2019, 12 pages.
Yang, et al., "Xlnet: Generalized autoregressive pretraining for language understanding", In Repository of arXiv:1906.08237v2, Jan. 2, 2020, pp. 1-18.
Yosinski, et al., "Understanding neural networks through deep visualization", In Repository of arXiv:1506.06579v1, Jun. 22, 2015, pp. 1-12.
Zeiler, et al., "Visualizing and understanding convolutional networks", In Proceedings of European Conference on Computer Vision, Sep. 6, 2014, pp. 818-833.
Zeiler, et al., "Adaptive Deconvolutional Networks for Mid and High Level Feature Learning", In Proceedings of the International Conference on Computer Vision, Nov. 2011, pp. 2018-2025.
Zhao, et al., "Generating natural adversarial examples", In Repository of arXiv:1710.11342v2, Feb. 23, 2018, pp. 1-15.
Zhou, et al., "Learning deep features for discriminative localization", In Repository of arXiv:1512.04150v1, Dec. 14, 2015, pp. 1-10.
"International Search Report and Written Opinion Issued in PCT Application No. PCT/US2020/059906", dated Feb. 25, 2021, 12 Pages.
"Constituency Parsing", Retrieved from: https://demo.allennlp.org/constituency-parsing/MTM2MzQyMQ==, Retrieved Date: Oct. 11, 2019, 1 Page.
Joshi, et al., "Extending a Parser to Distant Domains Using a Few Dozen Partially Annotated Examples", In Proceedings of the 56th Annual Meeting of the Association for Computational Linguistics, Jul. 15, 2018, 10 Pages.

* cited by examiner

TEXT-BASED SIMILARITY SYSTEM FOR COLD START RECOMMENDATIONS

BACKGROUND

A recommendation system is a system which makes a suggestion or recommendation with regard to an item which the system predicts may be of interest to the user. Recommendation systems can be a major component for content discovery. They are broadly used across different platforms and applications. These systems can be applied on various domains, product catalogs and more. In general, the most effective recommendations systems rely on collaborative filtering, a method that utilizes information extracted from historical activities of different users (sometimes called usage data).

However, in some instances, usage data for a user is unavailable. Usage data may not be available where a user is utilizing a service for the first time, is an unregistered user or otherwise is unknown to the system. These cold domains in which user history data is unavailable create challenges for recommendation systems which typically require at least some user-related data to create recommendations likely to be relevant or of interest to the user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some examples provide a system and method for generating cold-start recommendations based on title and description relationships. The language model is trained using a domain-specific corpus associated with a plurality of candidate items to distinguish between real title-description pairs and fake title-description pairs. The domain-specific corpus includes comprising a title and a description for each candidate item in the plurality of candidate items. The domain-specific language model generates a set of scores for each candidate item in the plurality of candidate items and a seed item. The set of scores includes a set of similarity scores and a set of classification scores associated with combinations of the seed item title, the seed item description, each candidate item title and each candidate item description. A recommendation component selects a set of recommended items from the set of candidate items based on the set of scores to maximize item similarities. The set of recommended items is output to at least one user.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
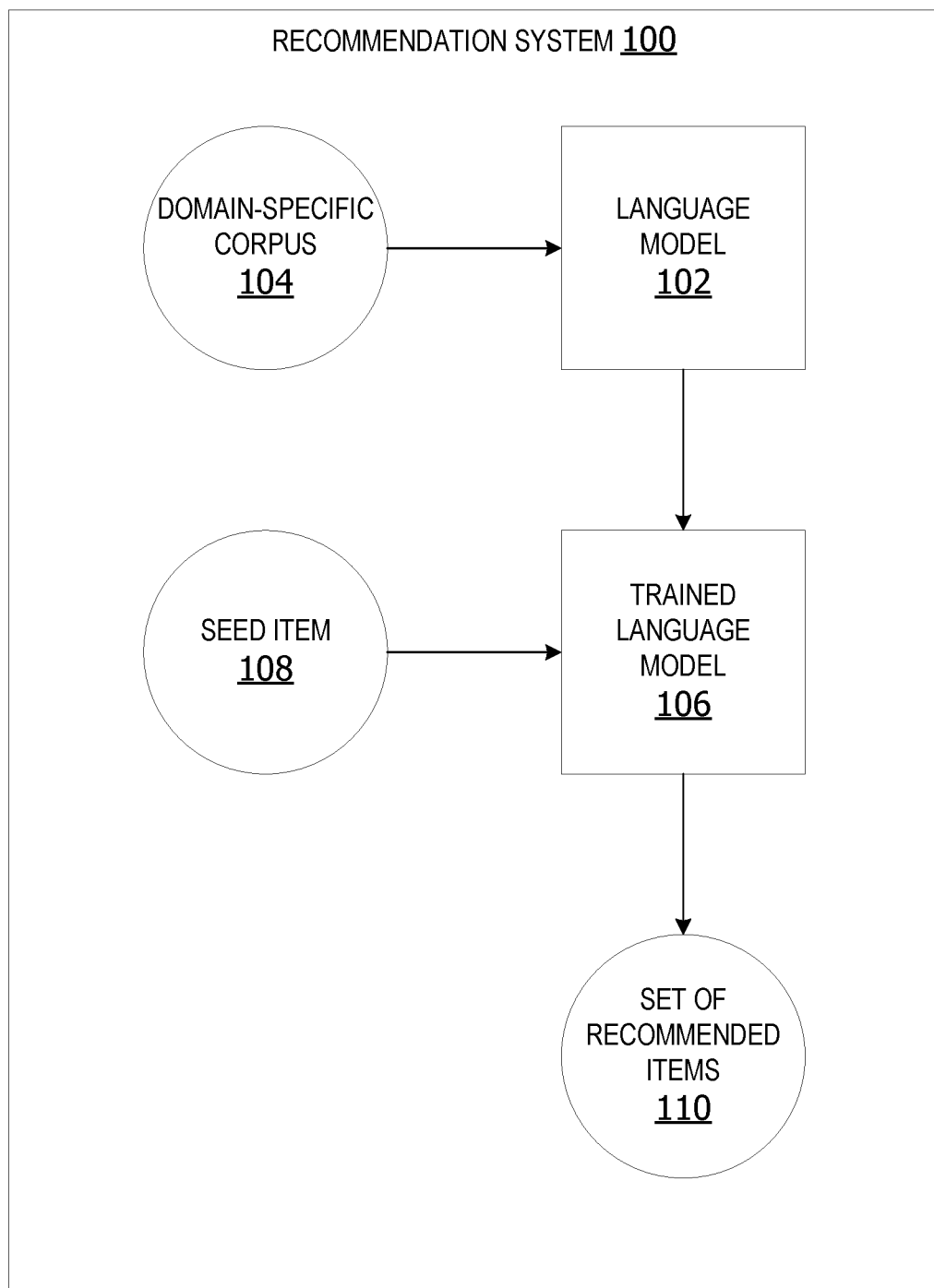
FIG. 1 is an exemplary block diagram illustrating a system for generating cold start recommendations using text-based similarities between items.

Aspects of the disclosure provide a content-based recommendation system utilizing textual information associated with a domain-based catalog of items to produce recommendations in an absence of user-related data, such as search histories, user profile data, transaction history, user-provided preference or any other user data. The system includes understanding models to generate content-based recommendations based on a seed item and can vary across different type of content, e.g. audio, video, images, text and more.

The recommendation system, including an unsupervised pretrained language model, can be applied on all domains that contain textual description, including cold domains, and is especially effective in mitigating the cold-start problem where usage-data is unavailable. The language model is general and can be applied on different domains. A domain is a subject area. A domain can include subject areas, such as, but not limited to, fashion, clothing, movies, music, drinks, shoes, pet supplies, books, or any other subject area. The language models do not require labels because the networks are trained in unsupervised manner, and hence can specialize on any given catalog for any domain.

A catalog is a domain-specific information source for a given subject that contains a list of items (plurality of items) and textual information associated with each item. The textual information for each item in the catalog can include a title and/or a description. The textual information can include sentences and/or paragraphs. A catalog for a movie domain in one example, includes a list of movies. Each movie item includes a movie title and a description of the movie in one or more sentences or one or more paragraph. Likewise, a domain for wines in another example includes a list of wines. Each wine item in the catalog include a name of a wine and a description of the wine. The description of each item in this non-limiting example may include the color (red or white), the producer or vineyard from which the wine originated, year of bottling, or other descriptive information.

The text-based similarity used to generate recommendations by the language model mitigates the cold start problem in item recommendation for improved user efficiency via user interface interaction providing the item recommendations to the user. This further reduces undesirable item recommendations while improving the likelihood the user will choose to utilize or purchase a recommended item.

Aspects of the examples provide a specialized language model trained using a domain-specific corpus to distinguish between real title-description pairs and fake title-description pairs associated with a plurality of candidate items. The domain-specific corpus includes a title and a description for each candidate item in the plurality of candidate items. This training enables the language model to compare one or more seed items with candidate items more accurately. The system generates cold-start recommendations which are more likely to be of interest to a user for whom no user data or usage data is available. This reduces user search time while improving user interaction with the system. This further improves security where recommendations can be made without using or storing of personal user information.

FIG. 1 is an exemplary block diagram illustrating a system 100 for generating cold start recommendations using text-based similarities between items. The system 100 includes an untrained language model 102. The language model 102 is a general language model or an unsupervised pre-trained language model. The language model 102 can include, without limitation, bidirectional encoder representations from transformers (BERT), ELMo deep contextualized word representations, XLNET, ALBERT or any other natural language processing (NLP) context-based language model.

The language model 102 executes on a computing device or a cloud server. The computing device can include any device executing computer-executable instructions (e.g., as application programs, operating system functionality, or both) to implement the operations and functionality associated with the untrained language model 102, such as, but not limited to, the computing device 1600 in FIG. 16 below. The computing device can be implemented as a mobile computing device or any other portable device. The computing device can also include less-portable devices such as servers, desktop personal computers, kiosks, or tabletop devices. Additionally, the computing device can represent a group of processing units or other computing devices. In some examples, the computing device has at least one processor and a memory.

The language model 102 and/or the trained language model 106 can also be implemented on a cloud server. A cloud server may be a logical server providing services to one or more computing devices or other clients. A cloud server may be hosted and/or delivered via a network for enabling communications with remote computing devices, such as, but not limited to, a local area network (LAN), a subnet, a wide area network (WAN), a wireless (Wi-Fi) network, the Internet or any other type of network. A cloud server can be implemented on one or more physical servers in one or more data centers. In other examples, the cloud server may be associated with a distributed network of servers.

The untrained language model 102 is trained or fine-tuned using a domain-specific corpus 104 of data. The domain-specific corpus 104 in some examples is created or derived from a catalog of items with textual descriptions (where textual descriptions are already given in most of the catalogs). The domain-specific corpus 104 can be derived from a single catalog or single source of domain-specific candidate item description data, as well as two or more catalogs or other sources of domain-specific textual data describing candidate items, as long as all the catalogs or other sources are for the same domain.

The domain-specific corpus 104 in other examples can include textual data obtained from a set of one or more articles and/or a set of one or more books that relate to the given catalog's domain. An article or book can include textual information, images containing text, video that contains text or spoken language, visual text, and/or audio containing spoken language. In some examples, audio information is converted to text via a speech-to-text application or audio-to-text sources. Likewise, text can be extracted or otherwise obtained from video or image files.

The language model 102 in some examples is an untrained general language model or a pre-trained language model that is trained or fine-tuned using a domain-specific corpus 104 to create a more domain-specific, specialized trained language model 106. The trained language model 106 is specialized to generate recommendations within the selected domain associated with the domain-specific corpus 104 in response to a user-selection of a seed item 108. In other words, domain-specific corpus is used to change a general language model into a specialized model trained to make recommendations within a selected domain using one or more catalogs for that domain. The seed item 108 is any item within the selected domain which has been selected or otherwise indicated by a user from a plurality of items within the selected domain. The seed item 108 is any item for which we want the system to generate one or more recommended items based on similarity of candidate items with the seed item independent of the user and/or without any user-specific information.

The trained language model 106 generates a set of one or more recommended items 110 from a plurality of candidate items. Thus, the system 100 in one example creates the domain-specific corpus 104 based on one or more catalogs, one or more books, one or more articles and/or one or more other domain-specific sources of textual data associated with a plurality of candidate items within a selected domain. The plurality of candidate items are described in the domain-specific corpus 104, which is used to train or fine-tune a specialist language model, such as, but not limited to, the trained language model 106. The trained language model analyzes a seed item description and infers item similarities between the seed item and one or more of the candidate items. The inferred item similarities are used to select the one or more recommended items in the set of recommended items 110.

The trained language model 106 in some examples is a deep learning (DL) language model (LM) used for identifying item similarities (IS). The LMIS type of trained language model 106 vectorizes all the items from a plurality of candidate items in a catalog and generates similarity scores from the vectors. The set of recommended items 110 includes one or more of the items which maximizes the similarity score(s) associated with each item in a plurality of candidate items available for recommendation.

In other examples, the trained language model 106 is a DL based relationship title-description (RTD) based language model, where each item in the plurality of candidate items includes a title and a description. The trained language model 106 learns the relationship between item titles and descriptions. The model fine-tunes on item-description pairs and learns to distinguish between real and fake title-description pairs. Next, the trained language model 106 scores items via a hybrid scoring system incorporating a combination of two title-description scores, title-title score and description-description score.

In still other examples, the trained language model 106 is a phrase-based similarity (PBS) type language model. The trained language model in these examples utilizes a phrase-based similarity method that extracts simple phrases from long descriptions. The trained language model 106 uses the extracted phrases to calculate similarity with other items with long textual descriptions.

Figure 2:
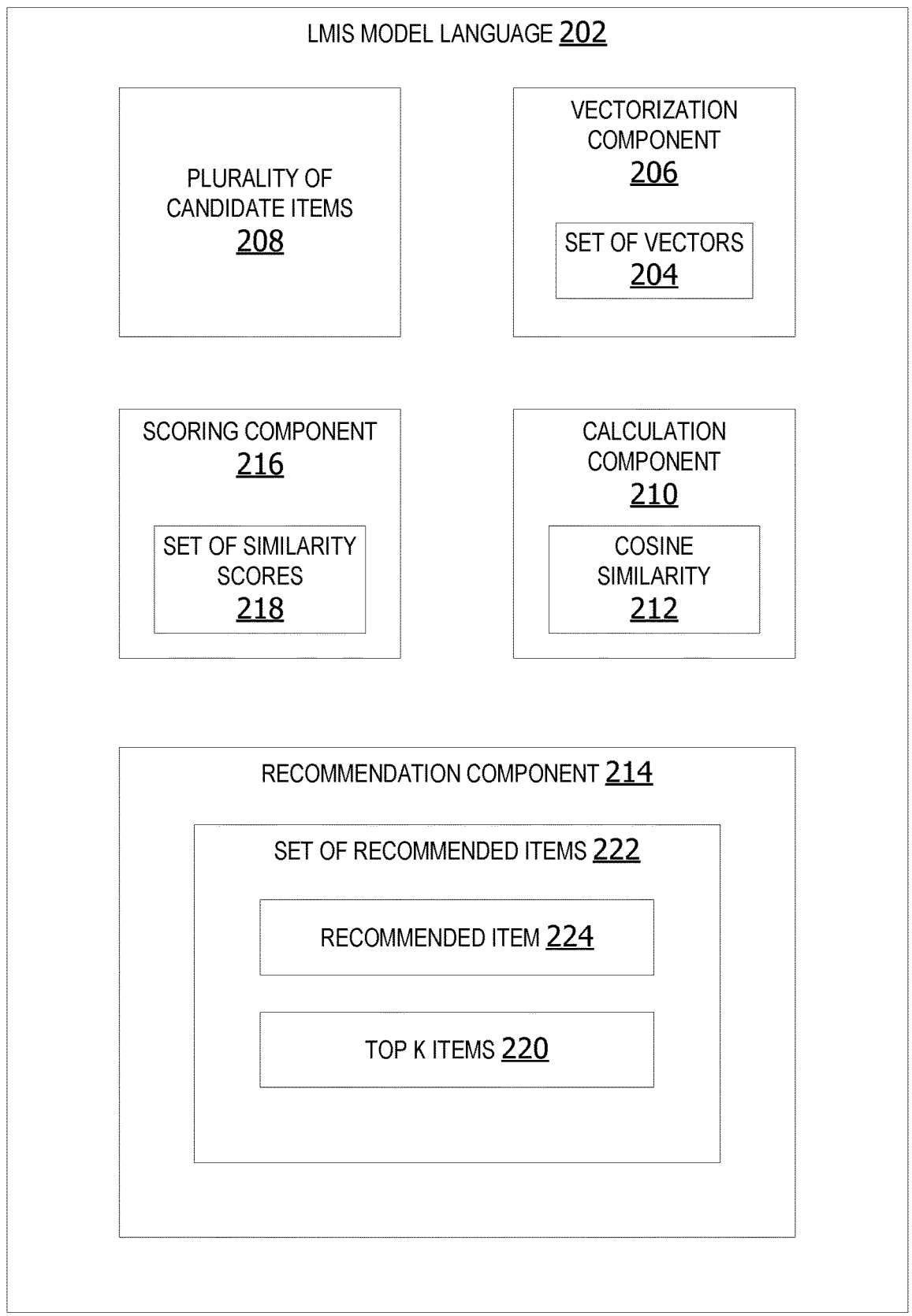
FIG. 2 is an exemplary block diagram illustrating a trained language model for generating recommended items based on item similarities.

FIG. 2 is an exemplary block diagram illustrating a trained language model 202 for generating recommended items based on item similarities. The trained language model 202 is a specialized language model trained on a domain-specific corpus, such as, but not limited to, the trained language model 106 in FIG. 1.

Figure 5:
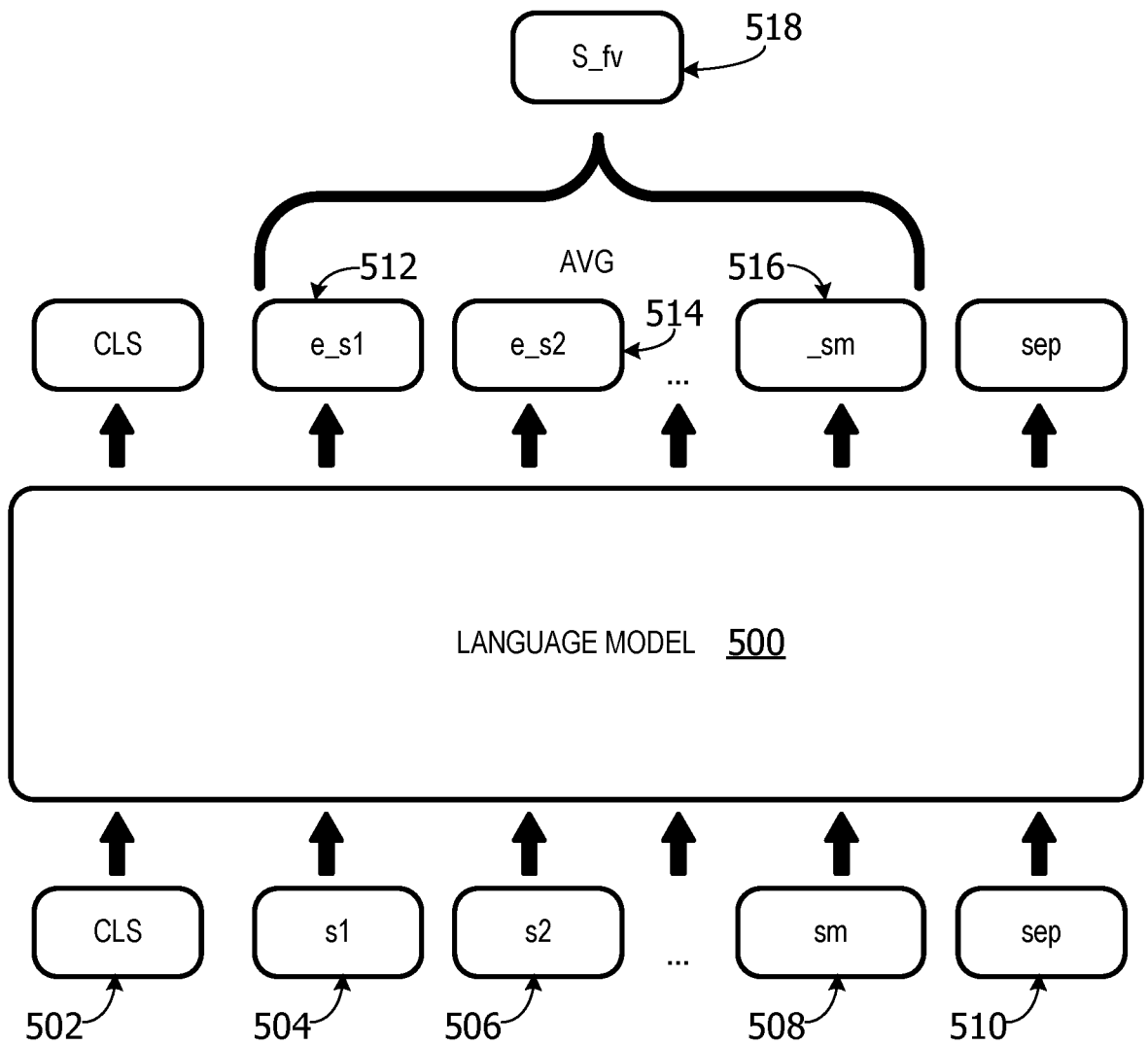
FIG. 5 is an exemplary block diagram illustrating a feature vector extraction for inference by a trained language model.

The trained language model 202 in this examples includes a set of vectors 204 generated by a vectorization component 206 for each item in a plurality of candidate items 208 included within a domain-specific catalog or other domain-specific corpus. To create the set of vectors, the vectorization component 206 maps all the descriptions and the titles of the items in the plurality of candidate items 208 in the catalog to a vector in a latent embedding space. Each title or description is tokenized and forward separately through the trained language model 202. The trained language model 202 outputs the corresponding embedded tokens for each input token. The embedded tokens are averaged across tokens, keeping the dimension of the embeddings unchanged, as shown in FIG. 5 below. Once the vectorization process is done, each item has a matched vector in the set of vectors 204.

In order to produce similarity for a given seed item S, a calculation component 210 calculates a cosine similarity 212 between the embedding vector of the seed item "S" and the embedding vectors of all the other items in the catalog. A scoring component 216 optionally converts the cosine similarity 212 to a set of similarity scores 218 for each candidate item. A recommendation component 214 sorts the candidate items in a descending order according to this cosine score for each item in the set of similarity scores 218. The recommendation component 214 retrieves the top K items 220 from the plurality of candidate items 208 as recommendations to form a set of recommended items 222, where "K" represents a user-configurable or user-selected number of items. The set of recommended items 222 is a set of one or more recommended items which is the same or similar to the seed item with regard to one or more attributes or properties, such as, but not limited to, the recommended item 224.

Figure 3:
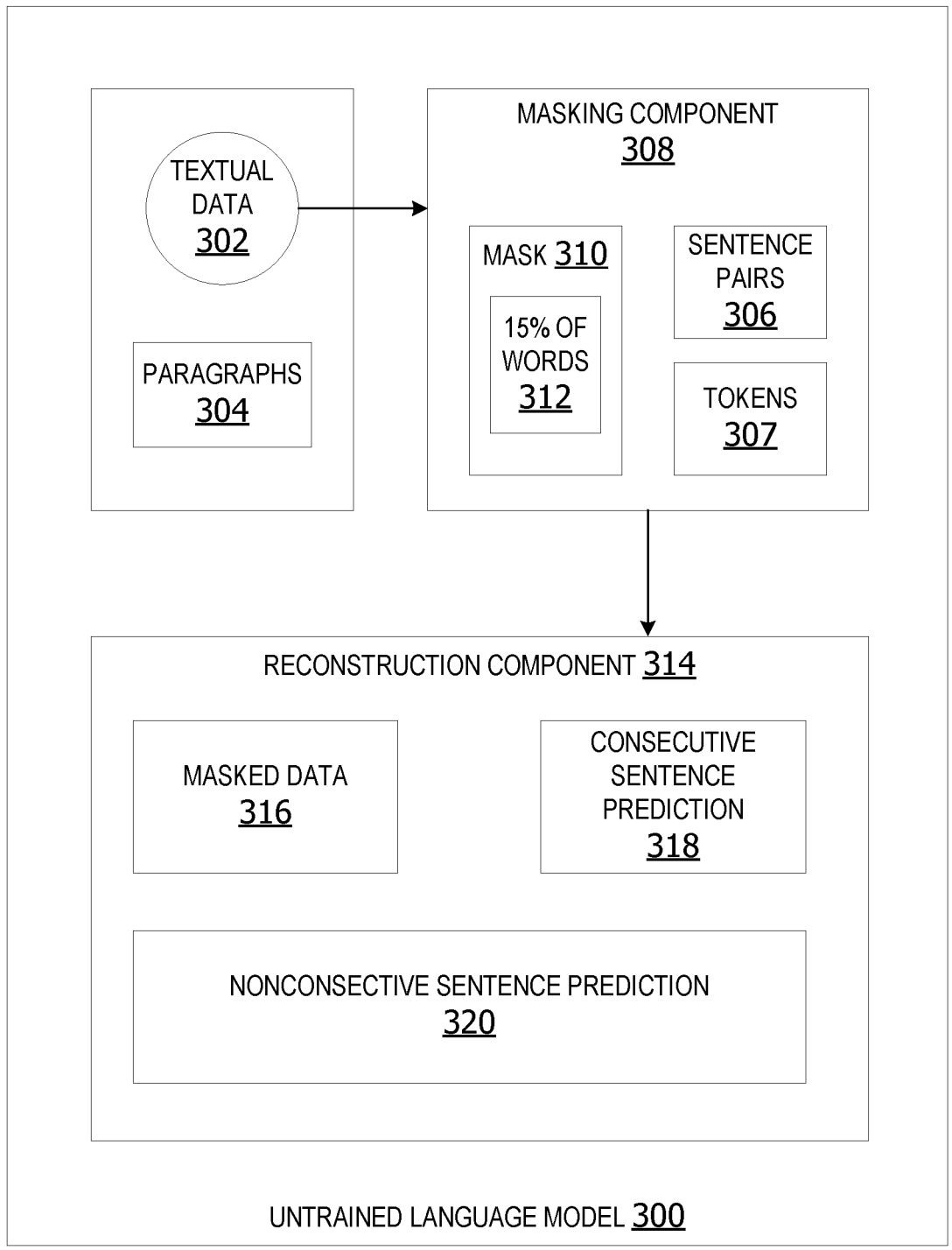
FIG. 3 is an exemplary block diagram illustrating training a language model using domain-specific textual data.

FIG. 3 is an exemplary block diagram illustrating training a language model 300 using domain-specific textual data 302. The language model 300 is a general language model or an unsupervised pre-trained language model which has not yet been trained or fine-tuned for a specific domain using a domain-specific corpus, such as, but not limited to, the language model 102 in FIG. 1.

The textual data 302 in this example is textual data which has been extracted or otherwise obtained from a catalog of items within the selected domain. The textual data 302 includes a plurality of paragraphs. Each paragraph in the paragraphs 304 describes an item in a plurality of items within the catalog.

The paragraphs 304 in some examples are extracted from a domain-specific corpus, such as, but not limited to, the domain-specific corpus 104 in FIG. 1. The domain-specific corpus may be formed by either extracting paragraphs of item descriptions from a given catalog, extracting paragraphs from domain-related articles and/or extracting paragraphs from domain-related books.

The domain-related corpus in other examples is split into two separate sets, a training data set and a validation data set. The paragraphs in each data set are kept whole. In other words, the paragraphs are fed into the language model 300 as a whole paragraph. For a domain-specific corpus composed of item descriptions, fifteen percent (15%) of the items may be placed in the validation set.

The language model 300 can be trained using the textual data 302 in the paragraphs 304 of the domain-specific corpus, either from scratch or by fine-tuning a pre-trained generalist language model. The training and/or fine-tuning of the language model 300 starts from a randomly initialized generalist pre-trained language model.

During training, the language model iterates over the paragraphs 304 in the training data set to extract sentence pairs 306. Half of the extracted sentence pairs 306 are consecutive sentences, in which the second sentence follows the first sentence in the original paragraph or other text from which the sentence pair is extracted. The other half (fifty percent) of the sentence pairs 306 is composed of sentence pairs with randomly chosen sentences that are not consecutive. In other words, the second sentence in the sentence pair did not originally follow the first sentence in the original paragraphs or other text from which the sentences in the sentence pair were extracted.

In this manner, the language model learns to distinguish between two sentences that are consecutive and sentences that are not consecutive. Sentences that are not consecutive are out of sequence or otherwise not provided in their original intended order. The language model utilizes machine learning and pattern recognition with the context of other words in the sentences to distinguish between pairs that are consecutive vs. non-consecutive.

Figure 4:
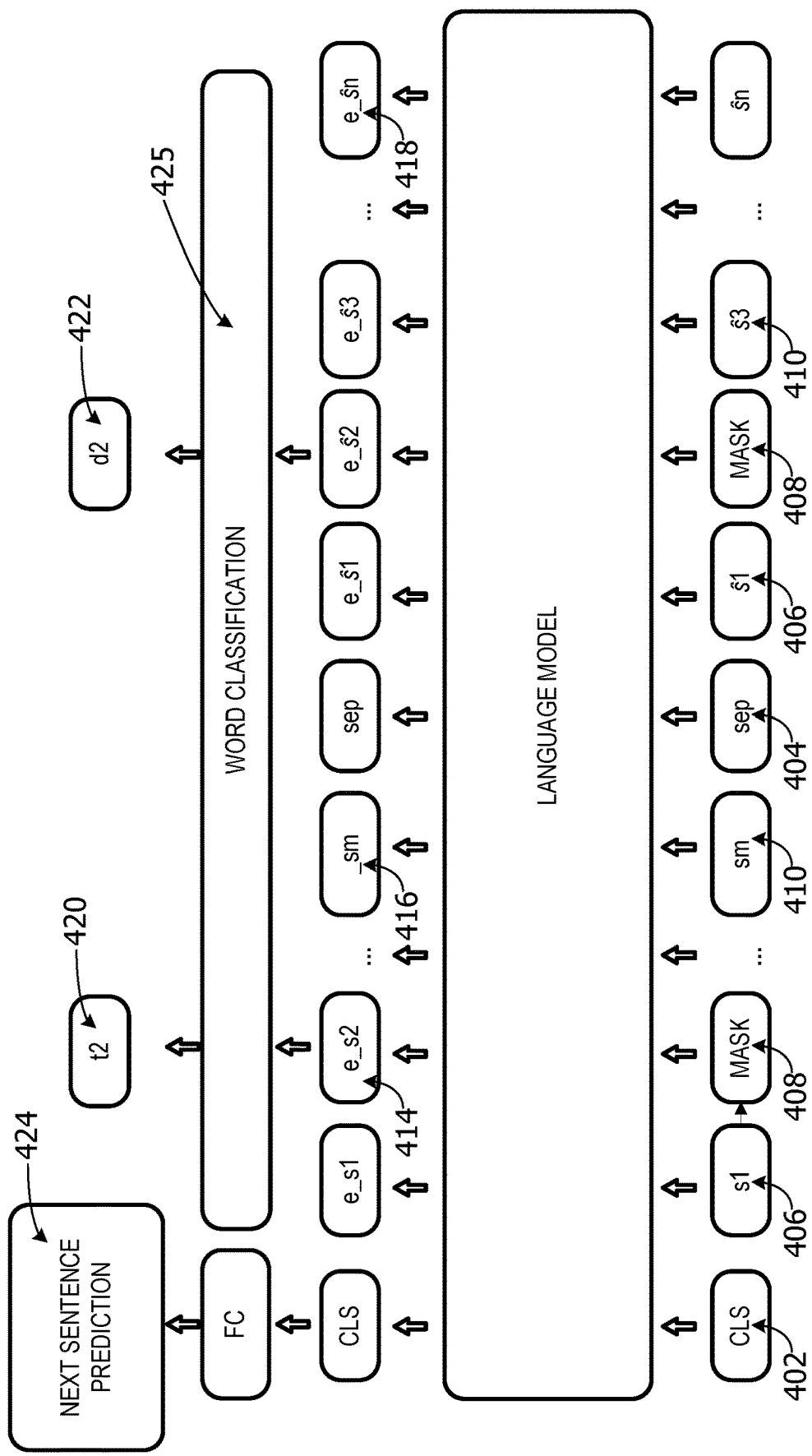
FIG. 4 is an exemplary block diagram illustrating LMIS training using a domain-specific corpus.

The sentences in each sentence pair are split into one or more tokens 307. A masking component 308 creates a mask 310 over fifteen percent (15%) of the tokens 307 and forwards them through the language model 300 as a unified sequence, as shown in FIG. 4 below. In other words, all the tokens for a given paragraph describing a candidate item are fed or input into the language model together as an entire sequence of all tokens for a single paragraph. The language model 300 maps each token to another token in some latent embedding space.

A reconstruction component 314 reconstruct the masked words from the embedded tokens within the masked data 316. The language model 300 makes a consecutive sentence prediction 318 or a non-consecutive sentence prediction 320 for each sentence pair. In other words, the language model 300 predicts, for each sentence pair, whether the second sentence is a continuation of the first sentence. This can also be referred to as named next sentence prediction. In this manner, fifteen percent of the sentences are masked and the language model reconstructs the masked sentences based on the context of the unmasked works remaining in the sentences.

The masking and consecutive sentence prediction tasks are implemented as two classifiers, each receiving different embedding tokens. Using an optimization algorithm, the training algorithm optimizes the model weights to minimize a multi-term loss incorporating both classifiers above. The optimization algorithm can be any type of optimizing algorithm, such as, but not limited to, the adaptive moment estimation (ADAM) optimization algorithm.

The training can run for a pre-defined number of epochs. After every epoch, the model performance is evaluated on the hold-out validation data set, reporting accuracy for the next sentence prediction task and the accuracy of reconstructing masked words. At the end of the language model training, the best model is selected according to the accuracy of reconstructing masked words, reported on the validation set.

FIG. 4 is an exemplary block diagram illustrating LMIS training using a domain-specific corpus. In this example, a pair of sentences extracted from a domain-specific corpus, such as a catalog, is fed into the language model 400. The language model is a generalized language model or an unsupervised pre-trained language model which is being trained or fine-tuned for the selected domain using the catalog, such as, but not limited to, the language model 102 in FIG. 1.

Each sentence in a sentence pair is fed into the language model 400. The sentences are split into tokens. In this example, the classification (CLS) token 402 represents the beginning of the first sentence and the separator (SEP) token 404 represents the end of the first sentence in the pair. The CLS token is a dummy token or vector input into the language model to indicate the beginning of a sentence.

The "S1" token 406 represents the first word in the sentence. The mask 408 token represents one of the masked tokens. In this example, fifteen percent of the tokens are masked. However, the examples are not limited to masking fifteen percent of the tokens. In other examples, a different percentage of the tokens can be masked. In some examples, ten percent of the tokens are masked, twelve percent of the tokens are masked, sixteen percent of the tokens are masked, twenty percent of the tokens are masked or any other percentage.

In this example, the token 410 represents another word in the first sentence. The token 406 represents the first word in the second sentence of the sentence pair. The token 408 is a masked token. The token 410 is a token associated with another word in the second sentence.

In some examples, the tokens for the two sentences in the sentence pair are forwarded through the language model 400 as a unified sequence. The language model 400 maps each token to another token in some latent embedding space. In this example, the token 410 is the token in the latent embedding space mapped to the token 406, the token 414 is mapped to the token 408, and the token 416 maps to the token 410 associated with the first sentence in the sentence pair. The token 418 maps to the token 406 associated with the second sentence.

The language model reconstructs the masked words from the embedded tokens to make a next sentence prediction 424 indicating whether the second sentence is consecutive with the first sentence (in correct sequence). The word classification 425 in some examples reconstructs or otherwise identifies the title 420 and description 422 of an item in the catalog based on the reconstruction of the masked words based on the context analysis of the unmasked words in the sentence pair.

FIG. 5 is an exemplary block diagram illustrating a feature vector extraction for inference by a trained language model 500. The trained language model is a model which has already been trained or fine-tuned using a domain-specific corpus, such as, but not limited to, the trained language model 106 in FIG. 1.

In order to produce item similarities, the language model 500 in this example maps all the descriptions and the titles of the items in the catalog to a vector in a latent embedding space. This process can be referred to as vectorization. Each title or description is tokenized and forward separately through the model.

In this example, the token 502 represents the beginning of a sentence or title. The token 504 represents the first word in a sentence or title. The token 506 represents the second word in the description sentence or title. The token 508 represents another word in the sentence. The token SEP 510 represents the end of the sentence. No tokens are masked here as the tokens are being analyzed by the model for item similarities between the seed item and each item in the plurality of candidate items in the catalog(s) for the selected domain.

The specialized, trained language model 500 outputs the corresponding embedded tokens for each input token. In this example, the embedded tokens in the latent embedding space include the tokens 512, 514 and 516.

The embedded tokens are averaged across tokens, keeping the dimension of the embeddings unchanged. Once the vectorization process is done, each item has a matched vector 518. In other words, the language model averages across the embedded tokens to generate one vector that summarizes the information that is a description of a given item.

In order to produce or identify candidate item similarity for a given seed item "S", the language model calculates the cosine similarity between the embedding vector of "S" and the embedding vectors of all the other items in the catalog, sorting the items in a descending order according to this cosine score, and retrieving the top "K" items as recommendations.

In this manner, the language model analyzes an entire paragraph associated with a seed item, performs tokenization and embedding, uses the average embedding as vector that summarizes information from the description (paragraph) to obtain a vector for each candidate item in the catalog. The language model iterates over the vectors to retrieve items that maximize the similarity score between the seed item and the candidate items.

In this manner, the language model iterates over all items in a catalog to extract an entire paragraph (description as a whole) for each candidate item. The system generates an embedding of each token for the paragraph and averages them to obtain vector summarizing information from the description of each candidate item. This is the scoring process, which may also be referred to as an embedding process. The language model performs this scoring process for each candidate item and generates a summary vector for each item. The system calculates cosine similarity between vectors and produces a recommendation for a specific item by retrieving items that maximize similarity scores based on the calculated cosine between every pair.

The set of recommendations is output to the user. The recommendations can be transmitted to a user device for display to the user via a user interface device, output via a printer, speaker, display screen or other output device, or any other type of output. In other examples, the set of recommendations are stored in a data storage device.

In this example, a set of tokens representing an item description is shown. However, the examples are not limited to the number of tokens shown in FIG. 5. In other examples, any number of tokens representing the title and/or description can be entered into the language model.

Figure 6:
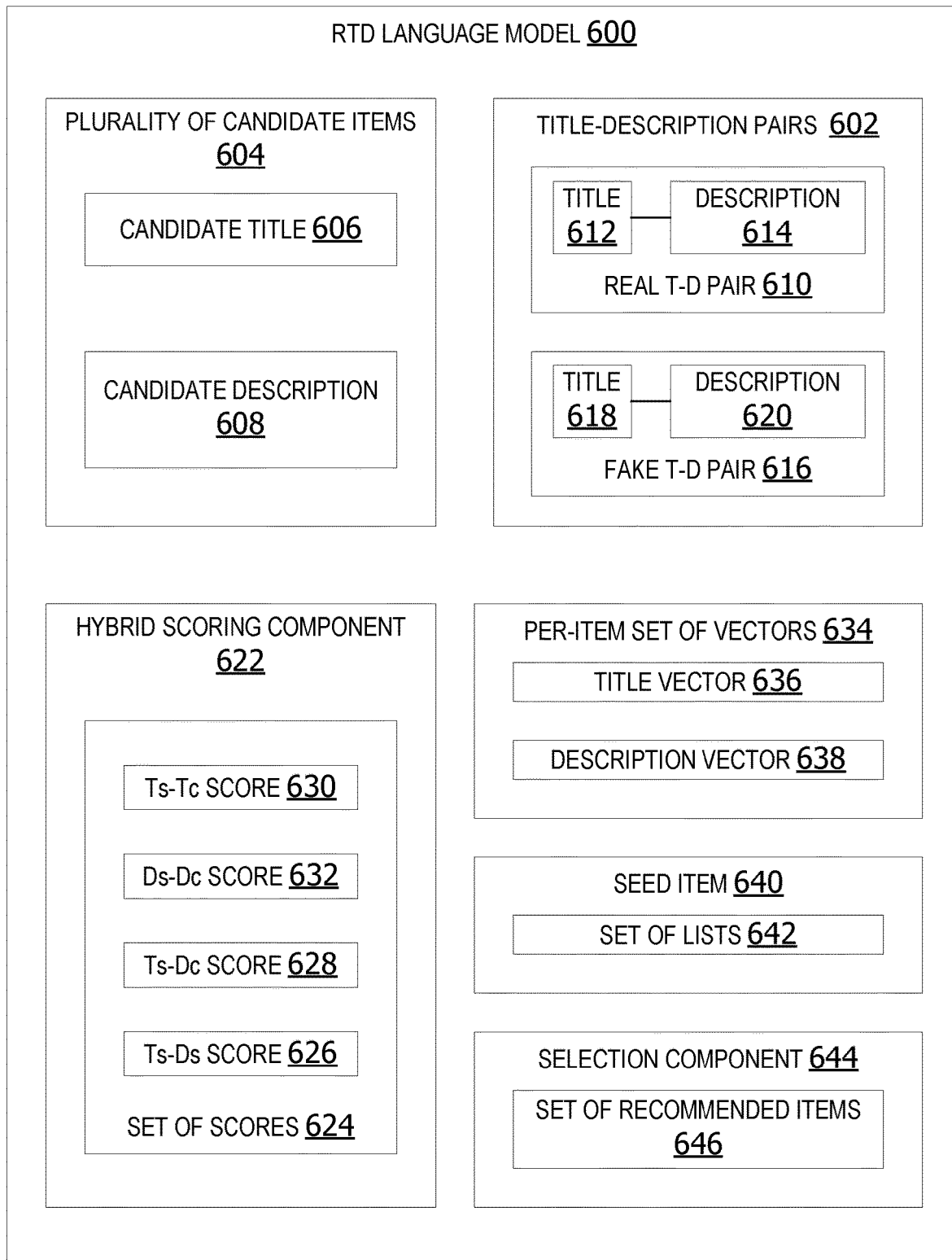
FIG. 6 is an exemplary block diagram illustrating an RTD-type language model.

FIG. 6 is an exemplary block diagram illustrating an RTD-type language model 600. The language model 600 is a trained, domain-specialized language model which has already been trained using a domain-specific corpus, such as, but not limited to, the trained language model 106 in FIG. 1.

The language model 600 includes a plurality of title-description pairs 602 associated with a plurality of candidate items 604 from a catalog or other domain-specific source. An item in the plurality of candidate items includes a candidate title 606 naming the item and a candidate description 608 describing the item.

The title-description pairs 602 in some examples includes real title-description (T-D) pairs and fake T-D pairs. A real T-D pair 610 includes a title 612 and a description 614 for the same item in the plurality of candidate items 604. In other words, the title 612 is the title of the same item which is described by the description 614 in the real T-D pair 610.

A fake T-D pair 616 includes a title 618 and a description 620 which were taken from two different items. The title 618 is the title of a first item and the description 620 in the same T-D pair describes a different, second item.

Given a seed item "S" and a candidate item "C", the language model 600 produces item similarities based on a hybrid score function that incorporates a linear combination of a set of one or more scores 624. The set of scores are generated by a hybrid scoring component 622.

In some examples, the hybrid scoring component 622 generates a Tc-Ds score 626 measuring or scoring the probability that the candidate item's title and the seed item description is a real T-D pair. The Tc-Ds can be denoted T_score.

The hybrid scoring component 622 in other examples generates a Ts-Dc score 628 measuring or scoring the probability that the seed item title and the candidate item description 628 is a real T-D pair. The Ts-Dc score can also be denoted D_score. The T_score and the D_score are classification scores.

In still other examples, the hybrid scoring component 622 generates two similarity scores. The similarity scores in some examples include a Ts-Tc score 630 comparing the seed item title with the candidate item title. The Ts-Tc score 630 can also be denoted as TT_score. The similarity scores in other examples include a Ds-Dc score 632 comparing the seed item description with a candidate item description. The Ds-Dc score 628 can also be denoted the DD_score. The similarity scores are calculated on the seed-candidate titles and seed-candidate descriptions using the language model's feature vector.

The per-item set of vectors 634 includes a title vector 636 and a description vector 638 for each item in the plurality of candidate items 604. The language model 600 iterates over each candidate item comparing each candidate item to the seed item 640 to generate a set of lists 642. The set of lists 642 includes a list of T_scores for each candidate item in the plurality of candidate items, a list of D_scores for each candidate item, a list of TT_scores for each seed item and candidate item, and a DD_score for each seed item and each candidate item in the plurality of candidate items 604.

In some examples, the language model 600 includes a total score function which is a weighted sum of D_score, T_score, DD_score and TT_score for each candidate item in the plurality of candidate items compared to the seed item. Similarities are produced by sorting the candidate items in descending order according to their total score and retrieving the top K items as the set of recommended items 646.

Figure 7:
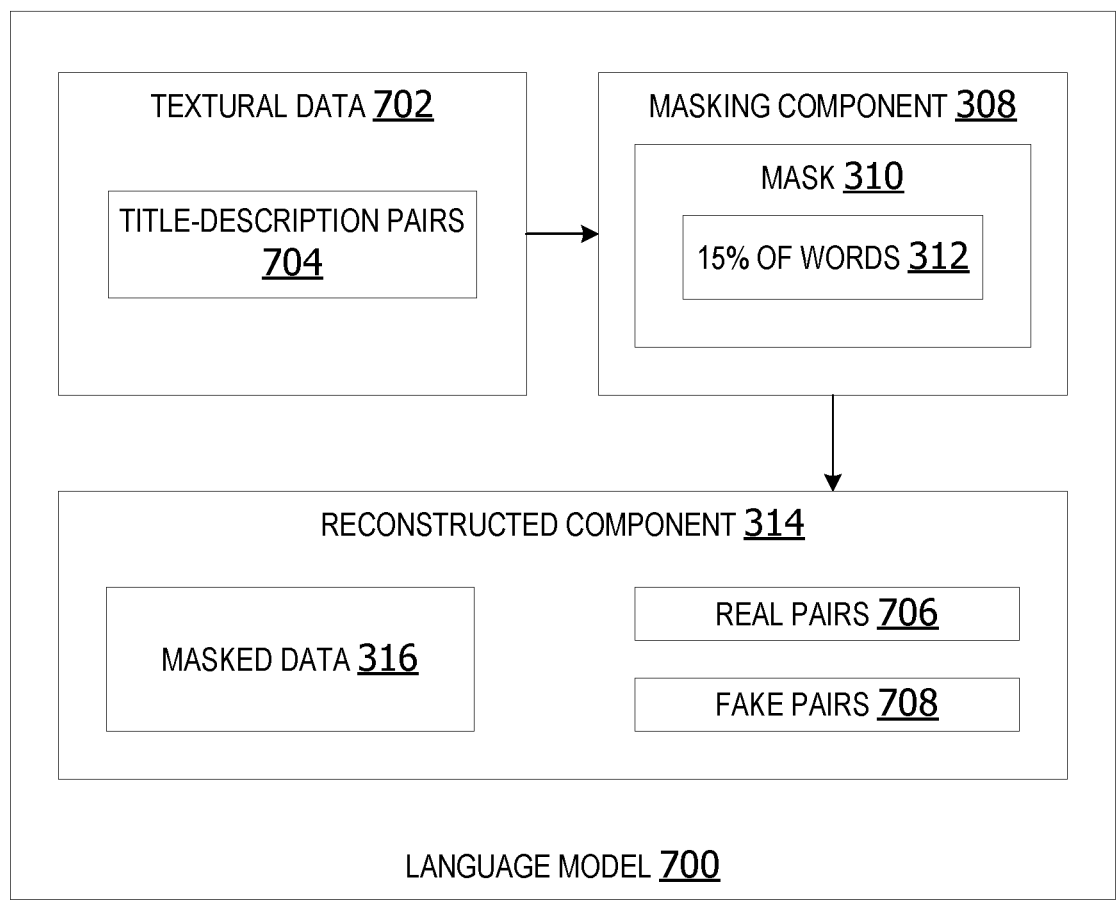
FIG. 7 is an exemplary block diagram illustrating training of an RTD type language model.

FIG. 7 is an exemplary block diagram illustrating training of an RTD type language model 700. The language model 700 is a language model which is being trained on a domain-specific corpus, such as, but not limited to, the language model 102 in FIG. 1.

During training, the language model 700 iterates over the data samples of the training set, including textual data 702. The training set includes title-description pairs 704 for each item in a plurality of items in a catalog or other domain-specific source, such as a book or article. A title-description pair is a title and a description.

For each sample, a masking component 308 randomly masks fifteen percent (15%) 312 of its words. The samples are fed or input into the language model 700 with mini batches. Each sample, which is a pair, is treated as a unified sequence. The reconstruction component 314 reconstructs the masked words to distinguish between real pairs 706 and fake pairs 708.

Both tasks are implemented by the language model 700 as a multi-term loss function, each receiving a different part of the model output. Specifically, the reconstruction loss receives the latent embedding of the masked words, and the real/fake classification loss receives the latent embedding of the first token in the sequence. Using an optimization algorithm, the model weights updated to minimize the above multi-term loss.

In other examples, the language model 700 trains for X epochs, where "X" represents a configurable number of epochs. The language model reports performance on the hold-out validation data set. At the end of the training, the best hypothesis is selected according to the accuracy of both masked language model task and the real/fake title-description pair discrimination task.

Figure 8:
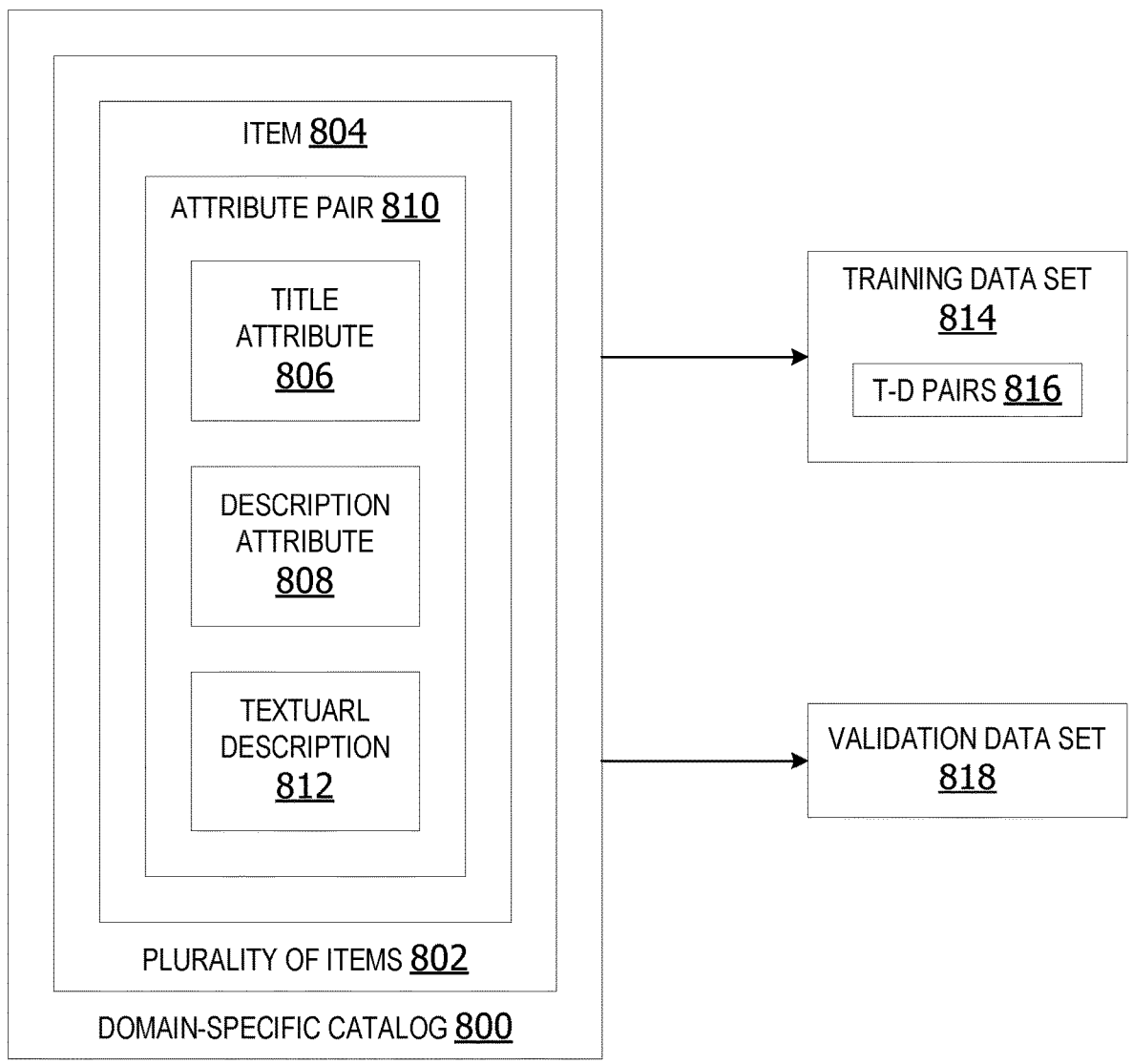
FIG. 8 is an exemplary block diagram illustrating a domain-specific catalog for training a language model.

FIG. 8 is an exemplary block diagram illustrating a domain-specific catalog for training a language model. In this domain-specific catalog 800 of a plurality of items 802, each item 804 is composed of a title attribute 806 and a description attribute 808 in an attribute pair 810. The title attribute includes the title of the item. The description attribute includes a description of the item. The description can be one or more sentences and/or one or more paragraphs describing one or more properties of the item. The title and description are provided in a textual description 812.

The catalog 800 in some examples is split or divided into a training data set 814 and a validation data set 818. For each set, data samples of title-description pairs 816 are created, where the description is treated as a whole. In other words, if the description is written in a paragraph format, the paragraph description for a given item is not broken down into sentences in this example.

For each set separately, two subset sets can be created. One subset includes real title-description pairs and another subset includes fake title-description pairs. Real pairs are composed of title and description elements that belong to the same item. The fake pairs are composed of title and description elements that were chosen from different items randomly. In other words, the title in one fake pair is taken from a first item while the description in the same fake pair is taken from a different, second item such that the title and description in the fake pair are mismatched.

Figure 9:
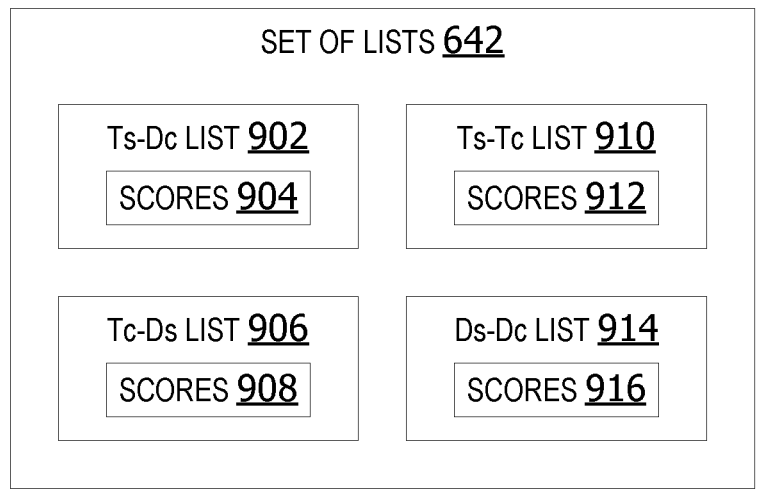
FIG. 9 is an exemplary block diagram illustrating a set of lists generated by a language model.

FIG. 9 is an exemplary block diagram illustrating a set of lists 642 generated by a language model. The set of lists 642 includes a Ts-Dc list 902 of scores 904 indicating the probability the title for the seed item is a match (real pair) with the description of the candidate item. There is a score for each candidate item in the plurality of candidate items in a catalog. Thus, if there are one hundred items in a catalog, the Ts-Dc list 902 includes one hundred scores. Likewise, if the plurality of candidate items in a catalog includes ten items, there are ten scores in the Ts-Dc list 902.

The Tc-Ds list 906 is a list of scores 908 indicating whether the candidate item title matches (is a real pair) with the seed item description. The Tc-Ds list includes an "N" number of scores, where "N" is the number of candidate items in the plurality of candidate items.

The Ts-Tc list 910 is a list of scores 912 indicating how similar the title of the seed item is when compared with the candidate item title. The Ts-Tc list 910 includes a score for each candidate item paired with the seed item. Thus, if there are "N" number of candidate items, the list 910 includes the same "N" number of scores.

The Ds-Dc list 914 is a list of scores 916 indicating the similarities between the seed item description and the candidate item description. The list 914 includes a score for each candidate item in the catalog.

Figure 10:
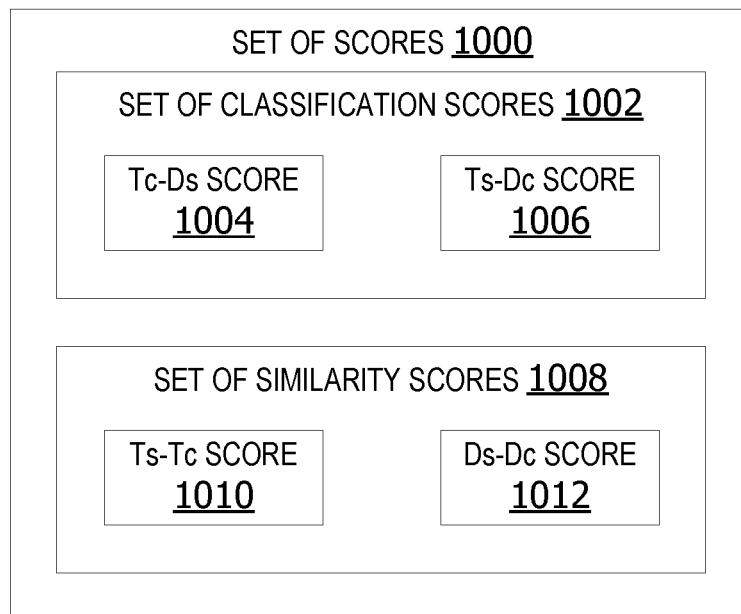
FIG. 10 is an exemplary block diagram illustrating a set of scores generated by a language model.

FIG. 10 is an exemplary block diagram illustrating a set of scores 1000 generated by a language model. The set of scores 1000 includes a set of classification scores 1002 and a set of similarity scores 1008. The set of classification scores 1002 includes the Tc-Ds score 1004 indicating the likelihood that the candidate title and the seed item description are a real pair The set of classification scores also includes the Ts-Dc score 1006 indicating the likelihood that the seed title and candidate item description are a real or fake pair.

In some examples, the set of classification scores are generated by the language model which predicts whether title and description in a T-D pair are matched and associated with the same item. The title of the seed item is used to iterate over catalog and match or pair the seed item title with descriptions of other candidate items in catalog. The language model generates probabilities that the seed title and candidate item descriptions are matched (real pair).

The language model uses the seed item description with the title of each candidate item to generates probabilities that the seed description and candidate item title are matched (real pair). Each seed item has four different lists. Each list is the size of the number of items in the catalog. The system retrieves the top K candidate items that maximizes the similarities between the seed item and the selected or recommended candidate items.

The set of similarity scores 1008 includes a Ts-Tc score 1010 indicating similarity between the seed item title and a title of a candidate item. The Ds-Dc score 1012 indicates the similarity between the seed item description and a given candidate item's description. In some examples, the language model calculates the cosine similarity between the title of the seed item with the other title feature vectors of the candidate items in the catalog. The language model also calculates the cosine similarity between the description of the seed item and the description of the candidate items. The language model calculates cosine between the feature vector of the title and cosine between the feature vector of the description to generate the set of similarity scores based on the cosine similarities for the titles and descriptions.

Figure 11:
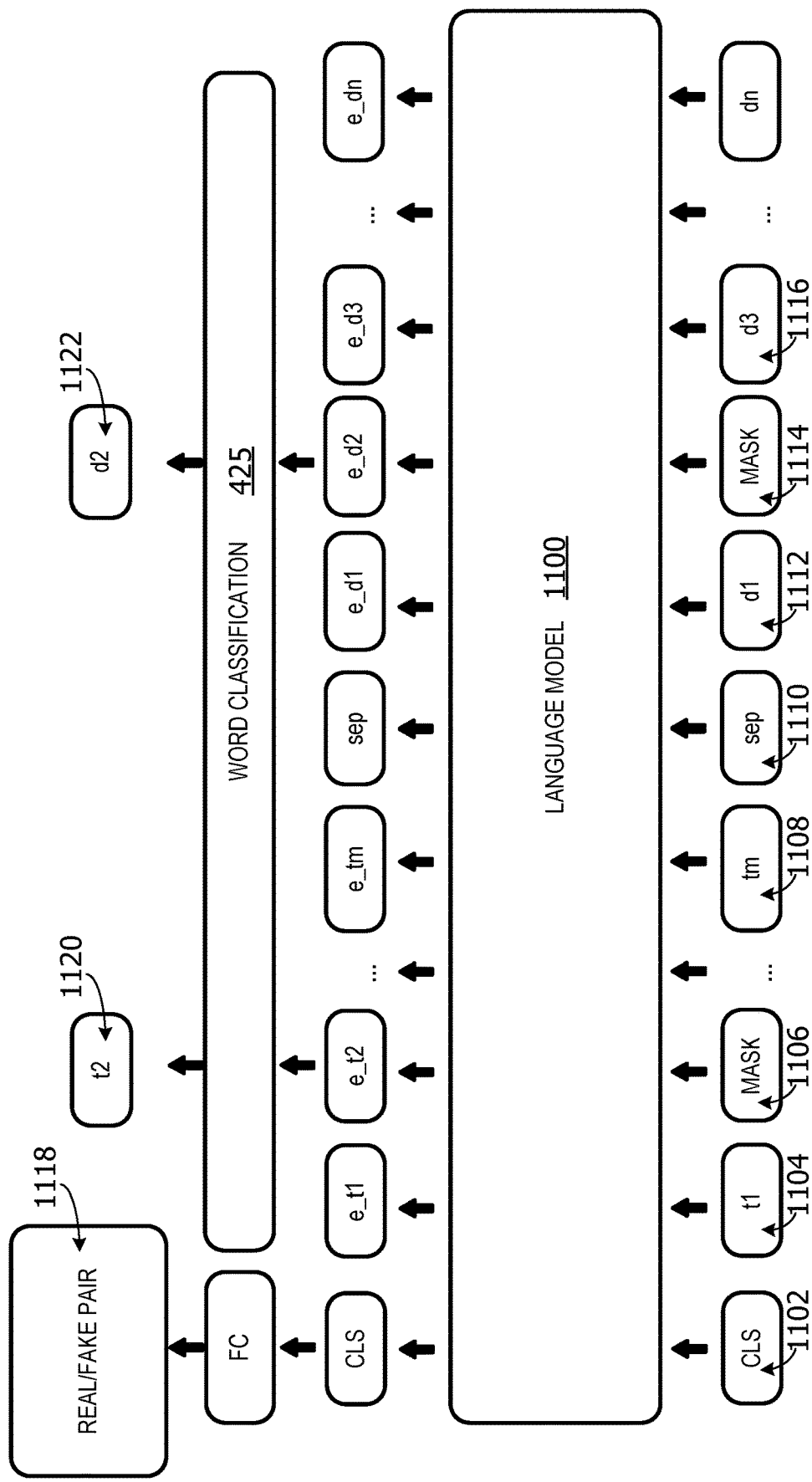
FIG. 11 is an exemplary block diagram illustrating an RTD type language model training.

FIG. 11 is an exemplary block diagram illustrating an RTD type language model 1100 training. The language model is an untrained or general language model which is being trained or fine-tuned using a corpus of domain-specific content. The language model is a model such as, but not limited to, the language model 102 in FIG. 1.

During RTD type training of a language model, the language model iterates over data samples of the training data set, including title 1120 and description 1122 pairs. For each sample, fifteen percent of the words are masked. In this example, the set of tokens includes a CLS token 1102 indicating a start of a title. A token 1104 represents a first word in a title. A token 1106 represents a word in a title that is masked. A token 1108 represents another word in the title. A token SEP 1110 indicates the end of the title. A token 1112 represents a word in a description. A token 1114 represents a masked word in the description. The token 1116 represents another word in the description.

The samples are being feed into the language model 1100. Each sample item-description pair is treated as a unified sequence. The language model 1100 reconstructs the masked words to identify the original title 1120 and description 1122. The language model 1100 distinguishes between real and fake pairs 1118.

Figure 12:
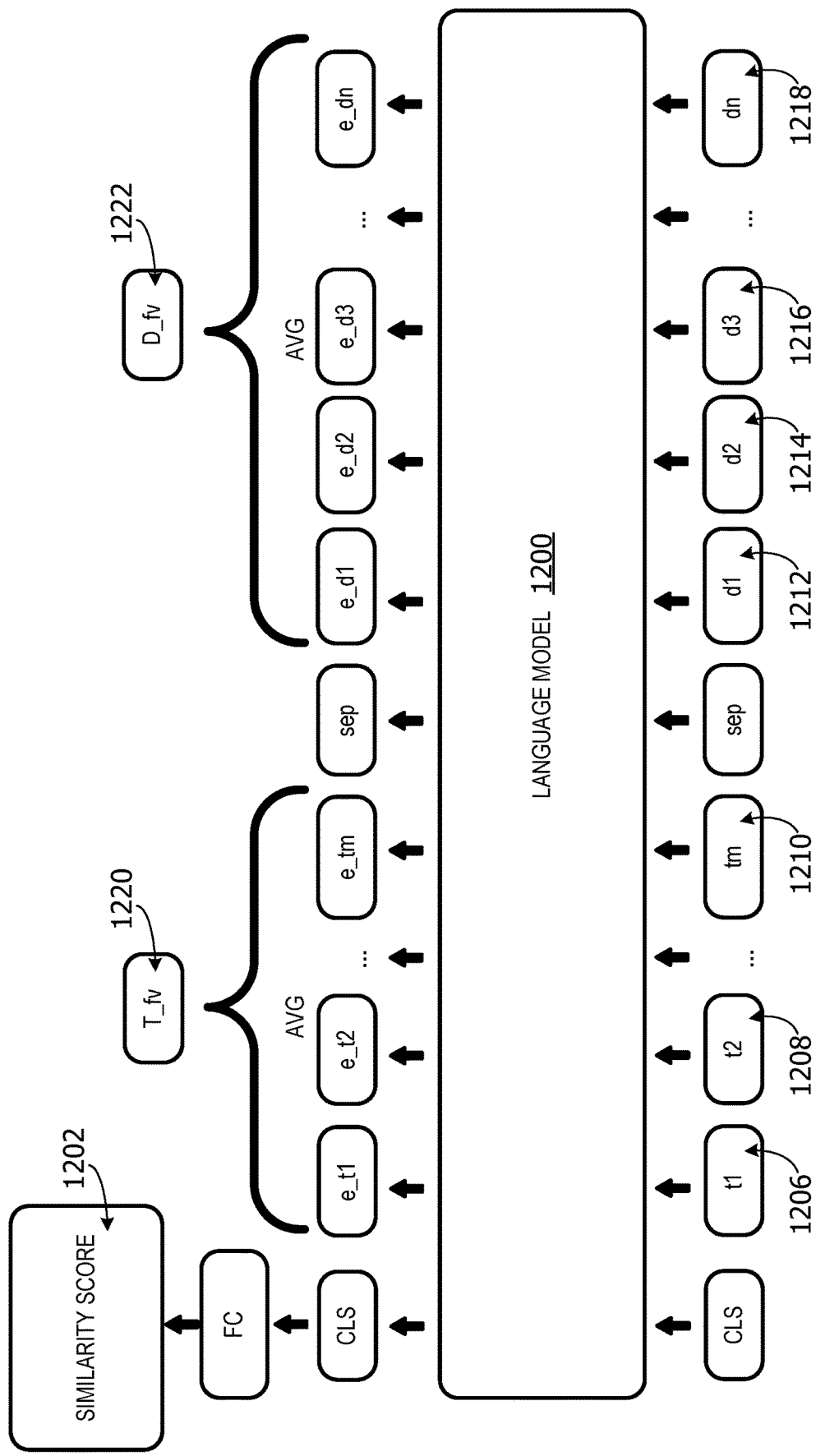
FIG. 12 an exemplary block diagram illustrating an RTD inference by a trained language model.

FIG. 12 an exemplary block diagram illustrating an RTD inference by a trained language model 1200. In this example, the language model is a specialized language model trained using a domain-specific corpus, such as, but not limited to, the trained language model 106 in FIG. 1. The language model generates a similarity score 1202 for a seed item based on a total score function, which is a weighted sum of two classification scores and two similarity scores for each candidate item and the seed item.

The language model utilizes title and description for an item as a unified sequence. In this example, a set of tokens representing the title are fed into the language model, including token 1206, 1208, 1210 and 1212. A set of tokens representing the seed item description includes token 1214, 1216 and/or 1218. However, the examples are not limited to the number of tokens shown in FIG. 12. In other examples, any number of tokens representing the title and/or description can be entered into the language model 1200.

The tokens are embedded and averaged. The language model generates the average feature vector from tokens that correlate to the titles and take another average feature vector from the tokens that correlate to the descriptions to create two vectors for each candidate item, one that summarizes the title and another one that summarizes the description.

The averaged embedded tokens are used to create a vector for the title and a vector for the description. Thus, each candidate item is associated with two feature vectors.

The language model iterates over the vectors for each item to generates the similarity scores for each item. The scores are compared to identify or maximize the similarity between the seed item and the candidate items. The candidate items having scores indicating the closes similarities with the seed item are chosen for recommendation to the user.

Figure 13:
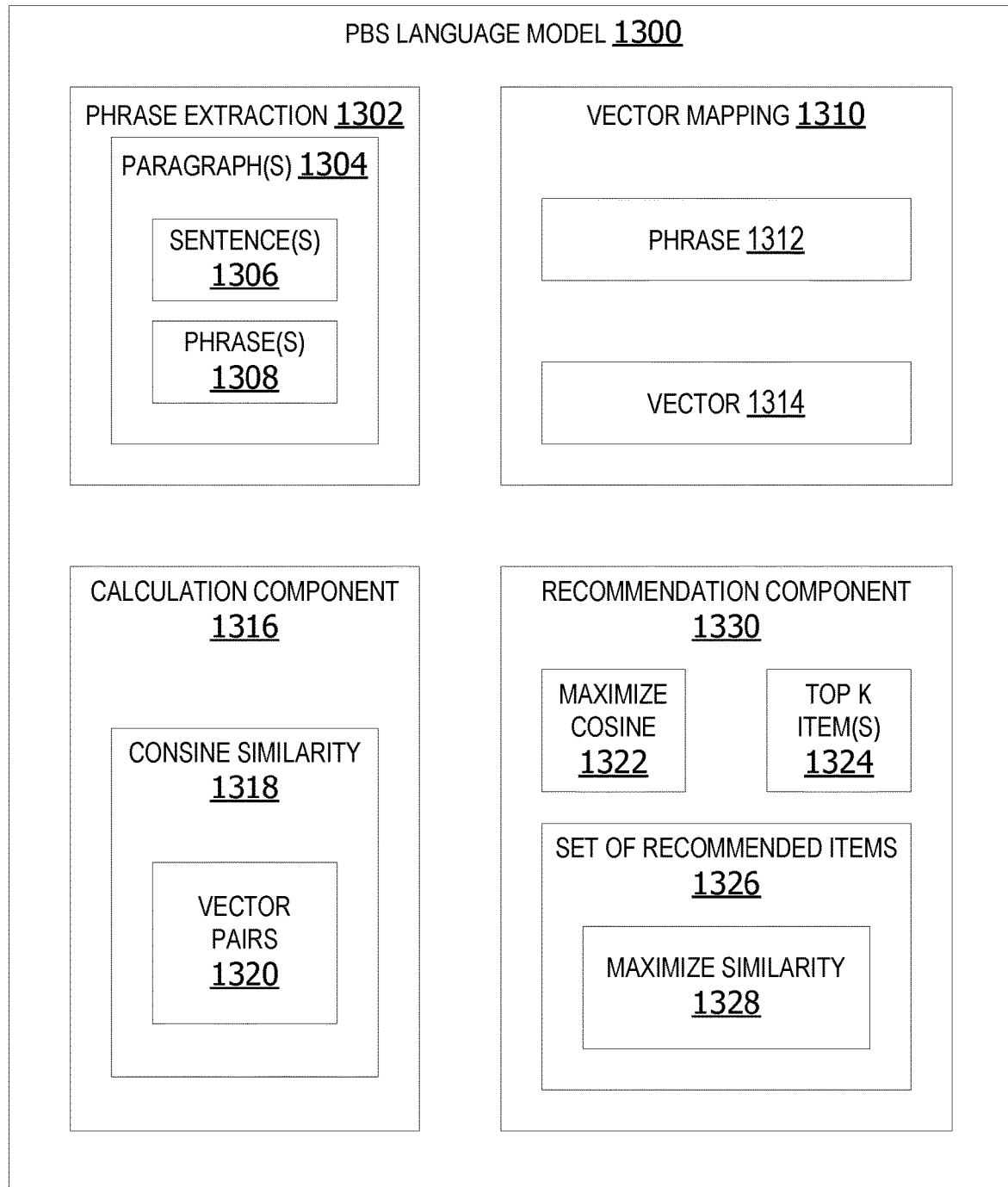
FIG. 13 an exemplary block diagram illustrating a phrase-based similarity (PBS) based language model.

FIG. 13 an exemplary block diagram illustrating a phrase-based similarity (PBS) based language model 1300. The language model 1300 in this example is a deep neural network model to extract full constituency trees from sentences. The language model 1300 traverses the trees from root to the leaves and decides for each node if its lexical content is informative enough and simple enough to harvest as a simple phrase. In this manner, the model uses a constituency tree to take paragraphs and split them into sub-sentences and extract phrases.

In some examples, a phrase extraction 1302 analyzes one or more paragraph(s) and breaks down the one or more sentence(s) 306 into one or more simple phrase(s) 308. For example, the phrase extraction dismantles the sentence, "James went to the corner shop to buy some eggs, milk and bread for breakfast" into the phrases: [James, the corner shop, "some eggs, milk and bread for breakfast"]. The phrase extraction algorithm extracts simple phrases and looks for noun-phrases or similar clauses. The system harvests them if they do not embed other complex clauses, otherwise it continues in the traversal.

The resulting list of phrases is then used for comparison with another item's list of simple phrases. The language model 1300 creates a bi-partite graph between the two items, where every phrase from the first item is compared and scored to every phrase of the second item in latent space for direct similarity. The score of the phrase pair is the weight of the edge connecting them in the bi-partite graph. A bi-partite max-weight matching is calculated over the graph, and the resulting aggregated weight of all edges in the matching becomes the similarity score for both items.

In some examples, a vector mapping 1310 maps each phrase 1312 into a vector 1314. A calculation component 1316 iterates over all vectors to calculate a cosine similarity 1318 between each pair of vectors, such as the vector pairs 1320. A recommendation component 1330 identifies pairs that maximize cosine and pairs them together as items with maximum similarity 1328.

The top K item(s) 1324 are selected from the plurality of candidate items and output as a set of recommended items 1328 based on the seed item selected by the user in an absence of user history data or any other user-related data.

In some examples, the language model 1300 is a fully trained model that knows how to break sentences into phrases based on textual descriptions for items. The important characteristics of each item can be represented by a few different phrases inside the description. The algorithm looks at the paragraph and breaks it into phrases to create a list of phrases for each item. The language model maps phrases or embeds them into latent space. In some examples, the language model maps each phrase into a vector. This creates different vectors for each item. Each item has a different set of vectors. The model calculates the cosine similarity between every pair of vectors that can be created between the two sets of vectors for the seed item and the candidate item. The system selects the pair that maximizes the cosine and combines them to form one score that represents the similarity between two items. This process is performed for every item in catalog. The system retrieves the top K items for recommendation to the user.

Figure 14:
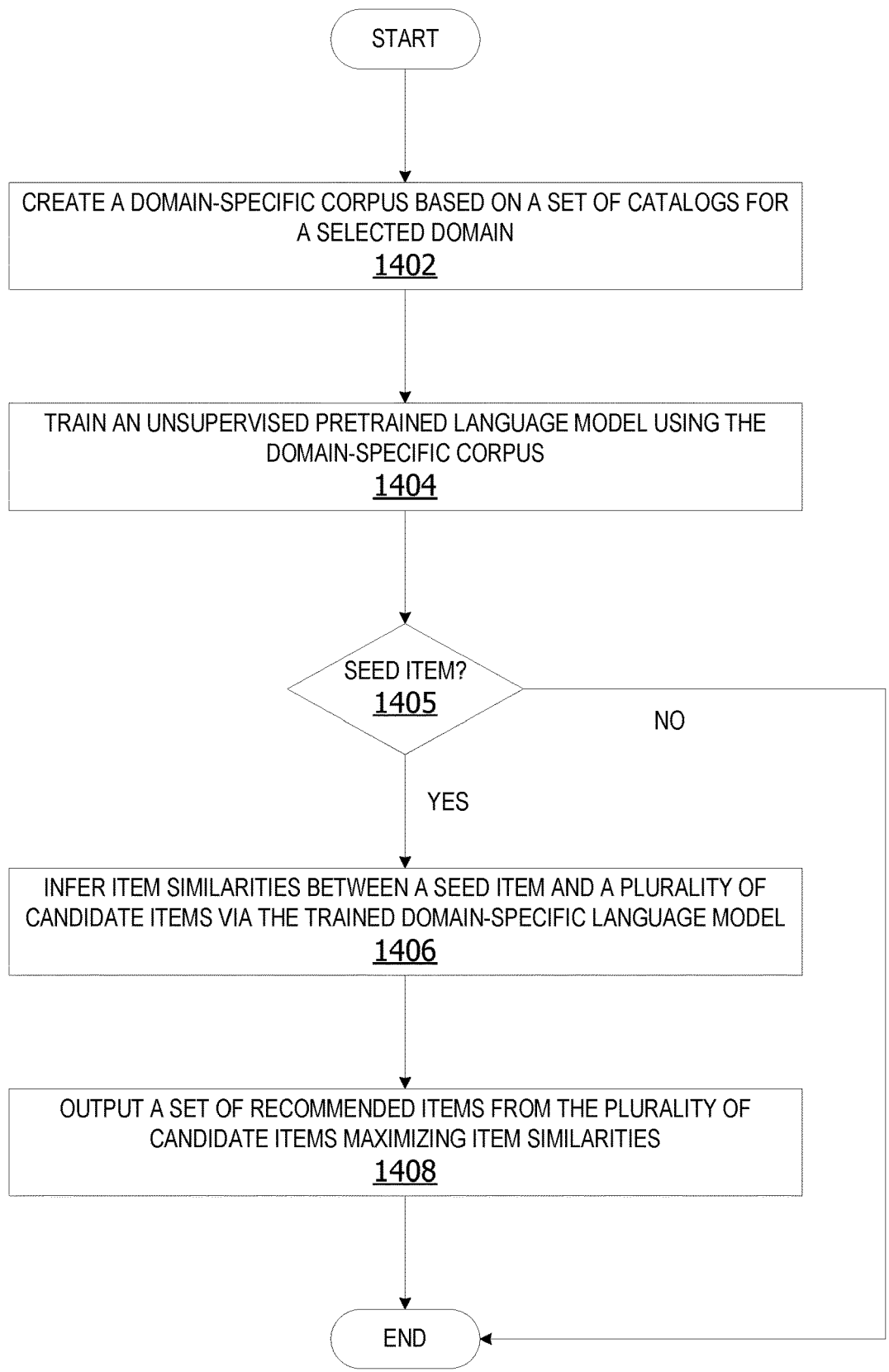
FIG. 14 is an exemplary flow chart illustrating operation of the computing device to generate a set of recommended items from a seed item using a language model trained on a domain-specific corpus.

FIG. 14 is an exemplary flow chart illustrating operation of the computing device to generate a set of recommended items from a seed item using a language model trained on a domain-specific corpus. The process shown in FIG. 14 is performed by a language model, executing on a computing device, such as the computing device 1600 of FIG. 16.

The process begins by creating a domain-specific corpus based on a set of catalogs for a selected domain at 1402. The language model is an unsupervised pretrained language model, such as, but not limited to, the language model 102 in FIG. 1. The language model is trained using the domain-specific corpus at 1404. A determination is made as to whether a seed item is selected by a user at 1405. If yes, the trained language model infers item similarities between a seed item and a plurality of candidate items via the trained language model at 1406. The trained language model outputs a set of recommended items from a plurality of candidate items in a catalog maximizing item similarities between the seed item and the candidate items at 1408. The process terminates thereafter.

While the operations illustrated in FIG. 14 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 14.

Figure 15:
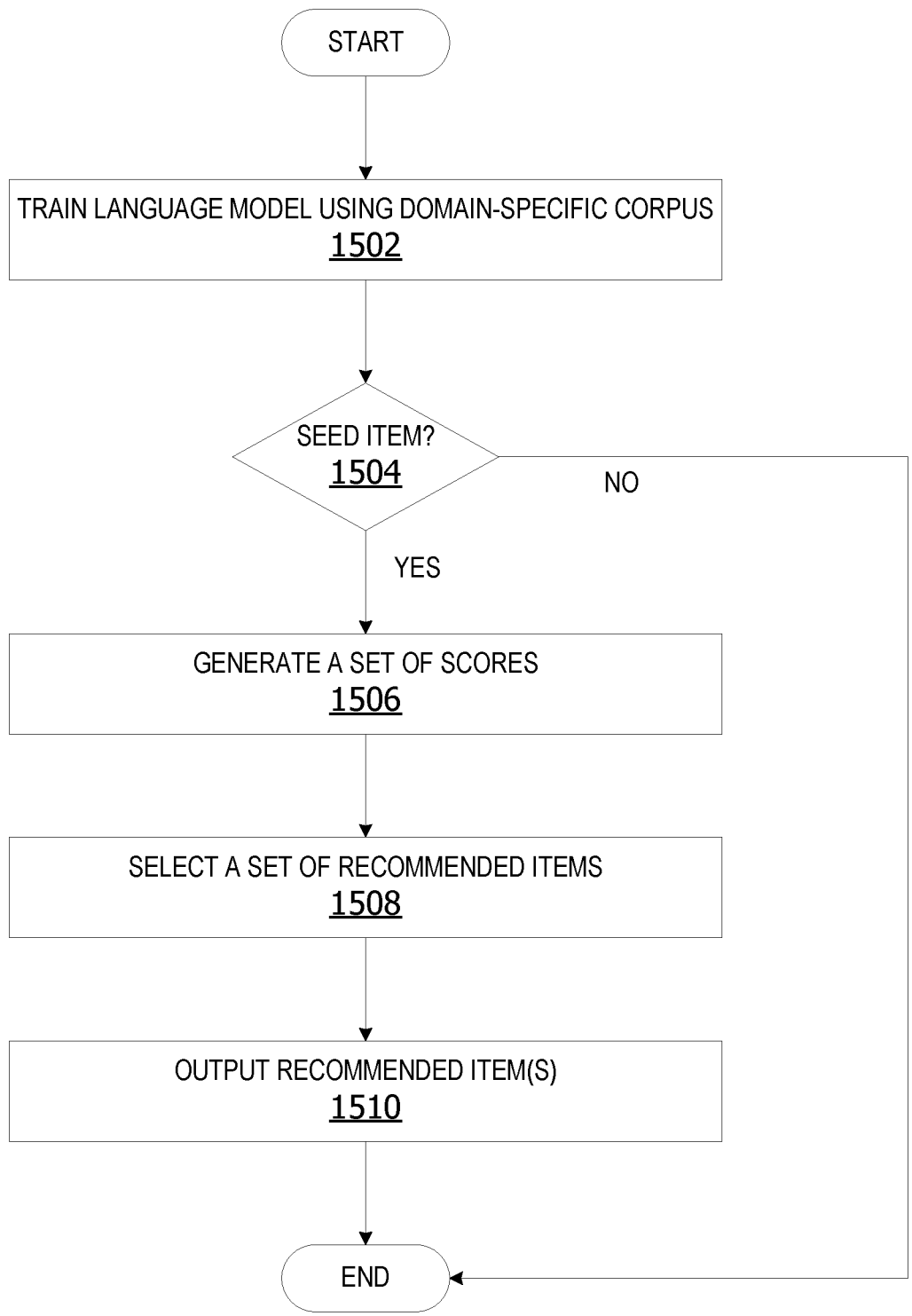
FIG. 15 is an exemplary flow chart illustrating operation of the computing device to generate a set of recommended items based on a set of scores generated by a language model trained on a domain-specific corpus.

FIG. 15 is an exemplary flow chart illustrating operation of the computing device to generate a set of recommended items based on a set of scores generated by a language model trained on a domain-specific corpus. The process shown in FIG. 15 is performed by a language model, executing on a computing device, such as the computing device 1600 of FIG. 16.

The process begins by training a language model using a domain-specific corpus at 1502. A determination is made whether a seed item is selected at 1504. If yes, the language model generates a set of scores at 1506. The set of scores can include a set of similarity scores and/or a set of classification scores generated based on item-description pair data. The language model selects a set of recommended items based on the set of scores at 1508. The set of recommended items is output to the user at 1510. The process terminates thereafter.

While the operations illustrated in FIG. 15 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 15.

ADDITIONAL EXAMPLES

Some aspects and examples disclosed herein are directed to a system, method and/or computer executable instructions for generating cold-start recommendations based on title and description relationships comprising: a processor; and a computer-readable medium storing instructions that are operative upon execution by the processor to: train a language model to distinguish between real title-description pairs and fake title-description pairs using a domain-specific corpus associated with a plurality of candidate items, the domain-specific corpus comprising a title and a description for each candidate item in the plurality of candidate items; generate a set of scores for each candidate item in the plurality of candidate items and a seed item, the set of scores comprising a set of similarity scores and a set of classification scores associated with combinations of the seed item title, the seed item description, each candidate item title and each candidate item description; select a set of recommended items from the set of candidate items based on the set of scores to maximize item similarities; and output, via a user interface, the set of recommended items to at least one user.

Additional aspects and examples disclosed herein are directed to a system, method or computer executable instructions for generating cold-start recommendations based on title and description relationships. A language model is trained to distinguish between real title-description pairs and fake title-description pairs using a domain-specific corpus associated with a plurality of candidate items. The domain-specific corpus comprising a title and a description for each candidate item in the plurality of candidate items. A scoring component generates a set of scores for each candidate item in the plurality of candidate items and a seed item.

The set of scores in some examples includes a set of similarity scores and a set of classification scores associated with combinations of the seed item title, the seed item description, each candidate item title and each candidate item description. A recommendation component selects a set of recommended items from the set of candidate items based on the set of scores to maximize item similarities. The set of recommended items is output to at least one user.

Additional aspects and examples disclosed herein are directed to a system, method and/or one or more computer storage devices having computer-executable instructions stored thereon for generating cold-start recommendations based on title and description relationships, which, on execution by a computer, cause the computer to perform operations comprising: training a language model to distinguish between real title-description pairs and fake title-description pairs using a domain-specific corpus associated with a plurality of candidate items; generating a set of scores for each candidate item in the plurality of candidate items and a seed item; selecting a set of recommended items from the set of candidate items based on the set of scores to maximize item similarities; and outputting, via a user interface, the set of recommended items to at least one user.

In an exemplary scenario, the system uses a catalog's item descriptions and titles to train a deep neural network as a language model. The trained language model specializes on the given catalog. The trained language model learns the unique characteristics of the domain associated with the catalog. The trained language model utilizes a corpus made of items and also learns the relationship between items title and description. At the end of the training, the trained or further fine-tuned language model produces similarities via a scoring process.

In some examples, the trained language model uses a seed item to produce item similarities by vectorizing all the items and measuring the similarity between the generated vectors. In other examples, the trained language model is used as a classifier that measures the textual similarity of each candidate item and the seed item. Both scoring techniques can be applied together or separately.

In yet other examples, the trained language model is a generalist pre-trained language model. The trained language model breaks sentences obtained from the domain-specific corpus into simple phrases. Specifically, given a catalog of items, the scoring process first breaks the textual description of each item into simple phrases. Then, given a seed item, the trained language model iterates over all the items in the catalog, and calculates a similarity score for each candidate item. The similarity score relies on a linear combination of similarities between pairs of phrases, where each pair incorporates one phrase from the seed item and one phrase from the candidate item.

The training (or fine-tuning) of the general language model in other examples starts from a randomly initialized (or pre-trained) language model. In one scenario, a BERT model is initialized with the weights of a pre-trained BERT model (that was trained on plain, unlabeled text from a variety of sources).

The RTD based language model in other examples involves training a neural network to find similarities between items with two known or pre-provided attributes (e.g., a title and a description) by using the attribute pairs of the same items to train the network. The language model compares first attributes to second attributes (e.g., compare title of item a to descriptions of items b-n and description of item a to titles of items b-n). Title-title comparisons and description-description comparisons may also be performed to identify similar items to the seed item for recommendation to the user in an absence of user profile data or other user history data.

In an exemplary scenario, if we have a specific domain of wine and we have a wine catalog, the language model is trained using the catalog to understand different wine characteristics. A generalist model is unable to understand differences between different wine characteristics. The color red may seem unimportant in a general language model, but the specialist trained language model understands, in context of a wine catalog, that the color red and white have a different meaning. The trained specialist language model understands the texture of description of items and conduct similarities and retrieve them as recommendations.

Alternatively, or in addition to the other examples described herein, examples include any combination of the following:

- the set of similarity scores includes a seed item title and candidate item title (Ts-Tc) score indicating similarity between the seed item title and a title of a given candidate item;
- the set of similarity scores includes a seed item description and candidate item description (Ds-Dc) score indicating similarity between the seed item description and a description of a given candidate item;
- the set of classification scores includes a candidate item title and seed item description (Tc-Ds) score indicating the likelihood that the candidate title and the seed item description are a real pair;
- the set of classification scores includes a seed item title and a candidate item description (Ts-Dc) score indicating the likelihood that the seed item title and the candidate item description are a real pair;
- generating a total score function which is a weighted sum of Ts-Dc score, Tc-Ds score, Ds-Dc score and Ts-Tc score for each candidate item in the plurality of candidate items compared to the seed item; and
- calculating cosine between a title feature vector and cosine between a description feature vector of a given candidate item to generate the set of similarity scores.

While the aspects of the disclosure have been described in terms of various examples with their associated operations, a person skilled in the art would appreciate that a combination of operations from any number of different examples is also within scope of the aspects of the disclosure.

Example Operating Environment

Figure 16:
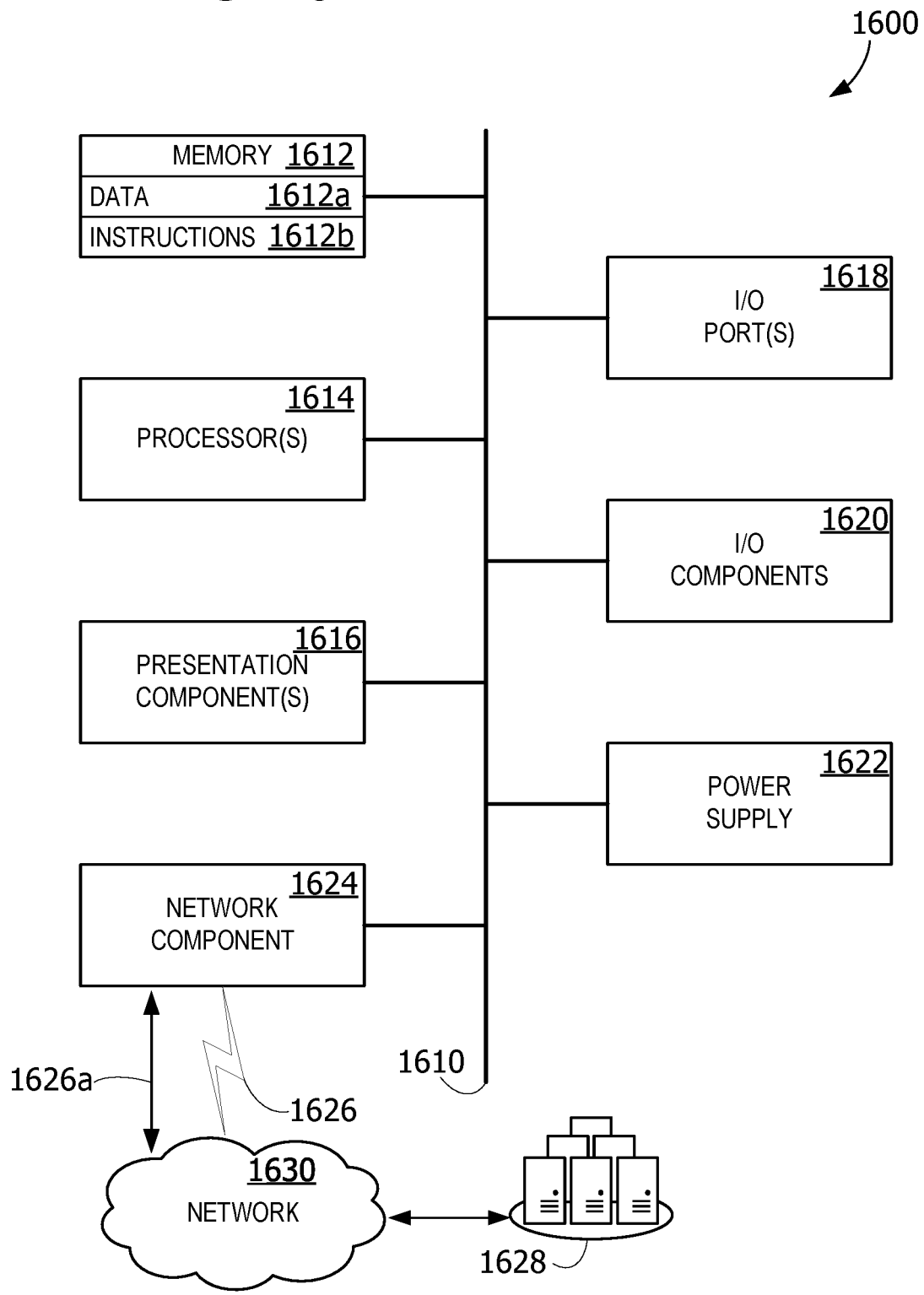
FIG. 16 is exemplary block diagram illustrating an example computing environment suitable for implementing some of the various examples disclosed herein.

FIG. 16 is a block diagram of an example computing device 1600 for implementing aspects disclosed herein and is designated generally as computing device 1600. Computing device 1600 is an example of a suitable computing environment and is not intended to suggest any limitation as to the scope of use or functionality of the examples disclosed herein. Neither should computing device 1600 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device.

Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1600 includes a bus 1610 that directly or indirectly couples the following devices: computer-storage memory 1612, one or more processors 1614, one or more presentation components 1616, I/O ports 1618, I/O components 1620, a power supply 1622, and a network component 1624. While computing device 1600 is depicted as a seemingly single device, multiple computing devices 1600 may work together and share the depicted device resources. For example, memory 1612 may be distributed across multiple devices, and processor(s) 1614 may be housed with different devices.

Bus 1610 represents what may be one or more busses (such as an address bus, data bus, or a combination thereof). Although the various blocks of FIG. 16 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 16 and the references herein to a "computing device."

Memory 1612 may take the form of the computer-storage media references below and operatively provide storage of computer-readable instructions, data structures, program modules and other data for computing device 1600. In some examples, memory 1612 stores one or more of an operating system, a universal application platform, or other program modules and program data. Memory 1612 is thus able to store and access data 1612a and instructions 1612b that are executable by processor 1614 and configured to carry out the various operations disclosed herein.

In some examples, memory 1612 includes computer-storage media in the form of volatile and/or nonvolatile memory, removable or non-removable memory, data disks in virtual environments, or a combination thereof. Memory 1612 may include any quantity of memory associated with or accessible by computing device 1600. Memory 1612 may be internal to computing device 1600 (as shown in FIG. 16), external to computing device 1600 (not shown), or both (not shown).

Examples of memory 1612 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 1600. Additionally, or alternatively, memory 1612 may be distributed across multiple computing devices 1600, for example, in a virtualized environment in which instruction processing is carried out on multiple computing devices 1600. For the purposes of this disclosure, "computer storage media," "computer storage device", "computer-storage memory," "memory," and "memory devices" are synonymous terms for computer-storage memory 1612, and none of these terms include carrier waves or propagating signaling.

Processor(s) 1614 may include any quantity of processing units that read data from various entities, such as memory 1612 or I/O components 1620 and may include CPUs and/or GPUs. Specifically, processor(s) 1614 are programmed to execute computer-executable instructions for implementing aspects of the disclosure. The instructions may be performed by the processor, by multiple processors within computing device 1600, or by a processor external to client computing device 1600. In some examples, processor(s) 1614 are programmed to execute instructions such as those illustrated in the in the accompanying drawings.

Moreover, in some examples, processor(s) 1614 represent an implementation of analog techniques to perform the operations described herein. For example, the operations may be performed by an analog client computing device 1600 and/or a digital client computing device 1600. Presentation component(s) 1616 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1600, across a wired connection, or in other ways. I/O ports 1618 allow computing device 1600 to be logically coupled to other devices including I/O components 1620, some of which may be built in. Example I/O components 1620 include, for example but without limitation, a microphone, joystick, game pad, satellite dish, scanner, printer, wireless device, etc.

Computing device 1600 may operate in a networked environment via network component 1624 using logical connections to one or more remote computers. In some examples, network component 1624 includes a network interface card and/or computer-executable instructions (e.g., a driver) for operating the network interface card. Communication between computing device 1600 and other devices may occur using any protocol or mechanism over any wired or wireless connection.

In some examples, network component 1624 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1624 communicates over wireless communication link 1626 and/or a wired communication link 1626a to a cloud resource 1628 across network 1630. Various different examples of communication links 1626 and 1626a include a wireless connection, a wired connection, and/or a dedicated link, and in some examples, at least a portion is routed through the internet.

Although described in connection with an example computing device 1600, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types.

Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for generating cold-start recommendations based on title and description relationships, the system comprising:
    a computer-readable medium storing instructions that are operative upon execution by a processor to:
        create a set of training samples, each training sample comprising a title and a description, from a domain-specific corpus associated with a plurality of candidate items, the domain-specific corpus comprising a title and a description for each candidate item in the plurality of candidate items;
        create a set of real title-description pairs and a set of fake title-description pairs within the set of training samples, each real title-description pair in the set of real title-description pairs comprising a title and a description of a same item and each fake title-description pair in the set of fake title-description pairs comprising a title of a first item and a description from a second different item;
        train a language model, the language model comprising a masking component and a reconstruction component, to distinguish between real title-description pairs and fake title-description pairs, wherein:
            the masking component randomly masks a pre-determined percentage of words in each training sample; and
            the reconstruction component reconstructs the masked words,
        and wherein the trained language model is used to generate, using the trained language model, a set of scores for each candidate item in the plurality of candidate items and a seed item, the set of scores comprising a set of similarity scores and a set of classification scores associated with combinations of the seed item title, the seed item description, each candidate item title and each candidate item description;
        select a set of recommended items from the set of candidate items based on the set of scores to maximize item similarities; and
        output, via a user interface, the set of recommended items to at least one user.

2. The system of claim 1, wherein the set of similarity scores includes a seed item title and candidate item title (Ts-Tc) score indicating similarity between the seed item title and a candidate item title of a given candidate item.

3. The system of claim 1, wherein the set of similarity scores includes a seed item description and candidate item description (Ds-Dc) score indicating similarity between the seed item description and a candidate item description of a given candidate item.

4. The system of claim 1, wherein the set of classification scores includes a candidate item title and seed item description (Tc-Ds) score indicating the likelihood that the candidate title and the seed item description are a real pair.

5. The system of claim 1, wherein the set of classification scores includes a seed item title and a candidate item description (Ts-Dc) score indicating the likelihood that the seed item title and the candidate item description are a real pair.

6. The system of claim 1, wherein the instructions are further operative to:
generate a total score function which is a weighted sum of Ts-Dc score, Tc-Ds score, Ds-Dc score and Ts-Tc score for each candidate item in the plurality of candidate items compared to the seed item.

7. The system of claim 1, wherein the instructions are further operative to:
calculate a cosine value between a title feature vector and a description feature vector of a given candidate item to generate the set of similarity scores.

8. A method of generating cold-start recommendations based on title and description relationships, the method comprising:
creating a set of training samples, each training sample comprising a title and a description, from a domain-specific corpus associated with a plurality of candidate items, the domain-specific corpus comprising a title and a description for each candidate item in the plurality of candidate items;
creating a set of real title-description pairs and a set of fake title-description pairs within the set of training samples, each real title-description pair in the set of real title-description pairs comprising a title and a description of a same item and each fake title-description pair in the set of fake title-description pairs comprising a title from a first item and a description from a second different item;
training a language model, the language model comprising a masking component and a reconstruction component, to distinguish between real title-description pairs and fake title-description pairs, wherein:
the masking component randomly masks a pre-determined percentage of words in each training sample; and
the reconstruction component reconstructs the masked words,
and wherein the trained language model is used to generate, using the trained language model, a set of scores for each candidate item in the plurality of candidate items and a seed item, the set of scores comprising a set of similarity scores and a set of classification scores associated with combinations of the seed item title, the seed item description, each candidate item title and each candidate item description;
selecting a set of recommended items from the set of candidate items based on the set of scores to maximize item similarities; and
outputting, via a user interface, the set of recommended items to at least one user.

9. The method of claim 8, wherein the set of similarity scores includes a seed item title and candidate item title (Ts-Tc) score indicating similarity between the seed item title and a candidate item title of a given candidate item.

10. The method of claim 8, wherein the set of similarity scores includes a seed item description and candidate item description (Ds-Dc) score indicating similarity between the seed item description and a candidate item description of a given candidate item.

11. The method of claim 8, wherein the set of classification scores includes a candidate item title and seed item description (Tc-Ds) score indicating the likelihood that the candidate title and the seed item description are a real pair.

12. The method of claim 8, wherein the set of classification scores includes a seed item title and a candidate item description (Ts-Dc) score indicating the likelihood that the seed item title and the candidate item description are a real pair.

13. The method of claim 8, further comprising:
generating a total score function which is a weighted sum of Ts-Dc score, Tc-Ds score, Ds-Dc score and Ts-Tc score for each candidate item in the plurality of candidate items compared to the seed item.

14. The method of claim 8, further comprising:
calculating a cosine value between a title feature vector and a description feature vector of a given candidate item to generate the set of similarity scores.

15. One or more computer storage devices having computer-executable instructions stored thereon for generating cold-start recommendations based on title and description relationships, which, on execution by a computer, cause the computer to perform operations comprising:
creating a set of training samples, each training sample comprising a title and a description, from a domain-specific corpus associated with a plurality of candidate items, the domain-specific corpus comprising a title and a description for each candidate item in the plurality of candidate items;
creating a set of real title-description pairs and a set of fake title-description pairs within the set of training samples, each real title-description pair in the set of real title-description pairs comprising a title and a description of a same item and each fake title-description pair in the set of fake title-description pairs comprising a title from a first item and a description from a second different item;
generating, using a language model, a set of scores for each candidate item in the plurality of candidate items and a seed item, the set of scores comprising a set of similarity scores and a set of classification scores associated with combinations of the seed item title, the seed item description, each candidate item title and each candidate item description, wherein the generating the set of scores comprises training the language model to distinguish between real title-description pairs and fake title-description pairs, wherein:
the masking component randomly masks a pre-determined percentage of words in each training sample; and
the reconstruction component reconstructs the masked words;
selecting a set of recommended items from the set of candidate items based on the set of scores to maximize item similarities; and
outputting, via a user interface, the set of recommended items to at least one user.

16. The one or more computer storage devices of claim 15, wherein the set of similarity scores includes a seed item title and candidate item title (Ts-Tc) score indicating similarity between the seed item title and a candidate item title of a given candidate item.

17. The one or more computer storage devices of claim 15, wherein the set of similarity scores includes a seed item description and candidate item description (Ds-Dc) score indicating similarity between the seed item description and a candidate item description of a given candidate item.

18. The one or more computer storage devices of claim 15, wherein the set of classification scores includes a candidate item title and seed item description (Tc-Ds) score indicating the likelihood that the candidate title and the seed item description are a real pair.

19. The one or more computer storage devices of claim 15, wherein the set of classification scores includes a seed item title and a candidate item description (Ts-Dc) score indicating the likelihood that the seed item title and the candidate item description are a real pair.

20. The one or more computer storage devices of claim 15, wherein the operations further comprise:
   generate a total score function which is a weighted sum of Ts-Dc score, Tc-Ds score, Ds-Dc score and Ts-Tc score for each candidate item in the plurality of candidate items compared to the seed item.

* * * * *